United States Patent
Ahmed et al.

(10) Patent No.: US 11,675,379 B2
(45) Date of Patent: Jun. 13, 2023

(54) VARIABLE-ADAPTIVE INTEGRATED COMPUTATIONAL DIGITAL LOW DROPOUT REGULATOR

(71) Applicant: Intel Corporation, Santa Clara, CA (US)

(72) Inventors: Khondker Ahmed, Hillsboro, OR (US); Harish Krishnamurthy, Beaverton, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 17/253,096

(22) PCT Filed: Sep. 6, 2019

(86) PCT No.: PCT/US2019/050037
§ 371 (c)(1),
(2) Date: Dec. 16, 2020

(87) PCT Pub. No.: WO2020/055695
PCT Pub. Date: Mar. 19, 2020

(65) Prior Publication Data
US 2021/0271277 A1    Sep. 2, 2021

Related U.S. Application Data

(60) Provisional application No. 62/731,760, filed on Sep. 14, 2018.

(51) Int. Cl.
*G05F 1/575* (2006.01)
*G06F 1/26* (2006.01)
(Continued)

(52) U.S. Cl.
CPC .......... *G05F 1/575* (2013.01); *G06F 1/26* (2013.01); *G06F 1/305* (2013.01); *H02M 3/157* (2013.01)

(58) Field of Classification Search
CPC .......... G06F 1/26; G06F 1/305; G05F 1/575; H02M 3/157
(Continued)

(56) References Cited

U.S. PATENT DOCUMENTS 9,983,605 B2    5/2018  Duong et al.
10,108,211 B2   10/2018 Ham et al.
(Continued)

FOREIGN PATENT DOCUMENTS

KR    20170083825    7/2017
KR    20180090706    8/2018

OTHER PUBLICATIONS

International Search Report and Written Opinion from PCT/US2019/050037 notified Jan. 6, 2020, 11 pgs.

*Primary Examiner* — Ji H Bae
(74) *Attorney, Agent, or Firm* — Schwabe, Williamson & Wyatt, P.C.

(57) ABSTRACT

A Computational Digital Low Dropout (CDLDO) regulator is described that computes a required solution for regulating an output supply as opposed to traditional feedback controllers. The CDLDO regulator is Moore's Law friendly in that it can scale with technology nodes. For example, CDLDO regulator of some embodiments uses a digital approach to voltage regulation, which is orders of magnitude faster than traditional digital LDOs and enables regulation at GHz speeds, making fast dynamic DVFS a reality. The CDLDO also autonomously tunes out the effects of process-voltage-temperature (PVT) and other non-idealities making the settling time totally variation tolerant.

22 Claims, 32 Drawing Sheets

(51) Int. Cl.
*H02M 3/157* (2006.01)
*G06F 1/30* (2006.01)

(58) Field of Classification Search
USPC .......................................................... 713/300
See application file for complete search history.

(56) References Cited

U.S. PATENT DOCUMENTS

| | | | |
|---|---|---|---|
| 10,216,209 B1* | 2/2019 | Ham | G05F 1/575 |
| 11,099,591 B1* | 8/2021 | Köse | G05F 1/59 |
| 2010/0225295 A1 | 9/2010 | Kranz et al. | |
| 2016/0246342 A1 | 8/2016 | Muthukaruppan et al. | |
| 2016/0282889 A1* | 9/2016 | Mahajan | G05F 1/575 |
| 2017/0315601 A1 | 11/2017 | Muthukaruppan et al. | |
| 2018/0267480 A1* | 9/2018 | Mahajan | G04F 10/005 |
| 2019/0064862 A1* | 2/2019 | Pan | G05F 1/561 |
| 2019/0115919 A1* | 4/2019 | Kim | H03K 19/017545 |
| 2022/0011800 A1* | 1/2022 | Nasir | C08L 1/284 |

* cited by examiner

| Mux selection options | | Description |
|---|---|---|
| S1 | S0 | |
| 0 | 0 | Computational Controller (CC) |
| 0 | 1 | All Off (PG_Code = 0) |
| 1 | 0 | All ON (PG_Code = 1023) |
| 1 | 1 | Linear Controller (LC) |

Droop Sequence: S1S0 : 11 à 10 à 01 à 10 à 00 à 11
Overshoot sequence: S1S0: 11à 01 à 10 à 01 à 00 à 11

Timing diagram showing the history timeout period and register reset

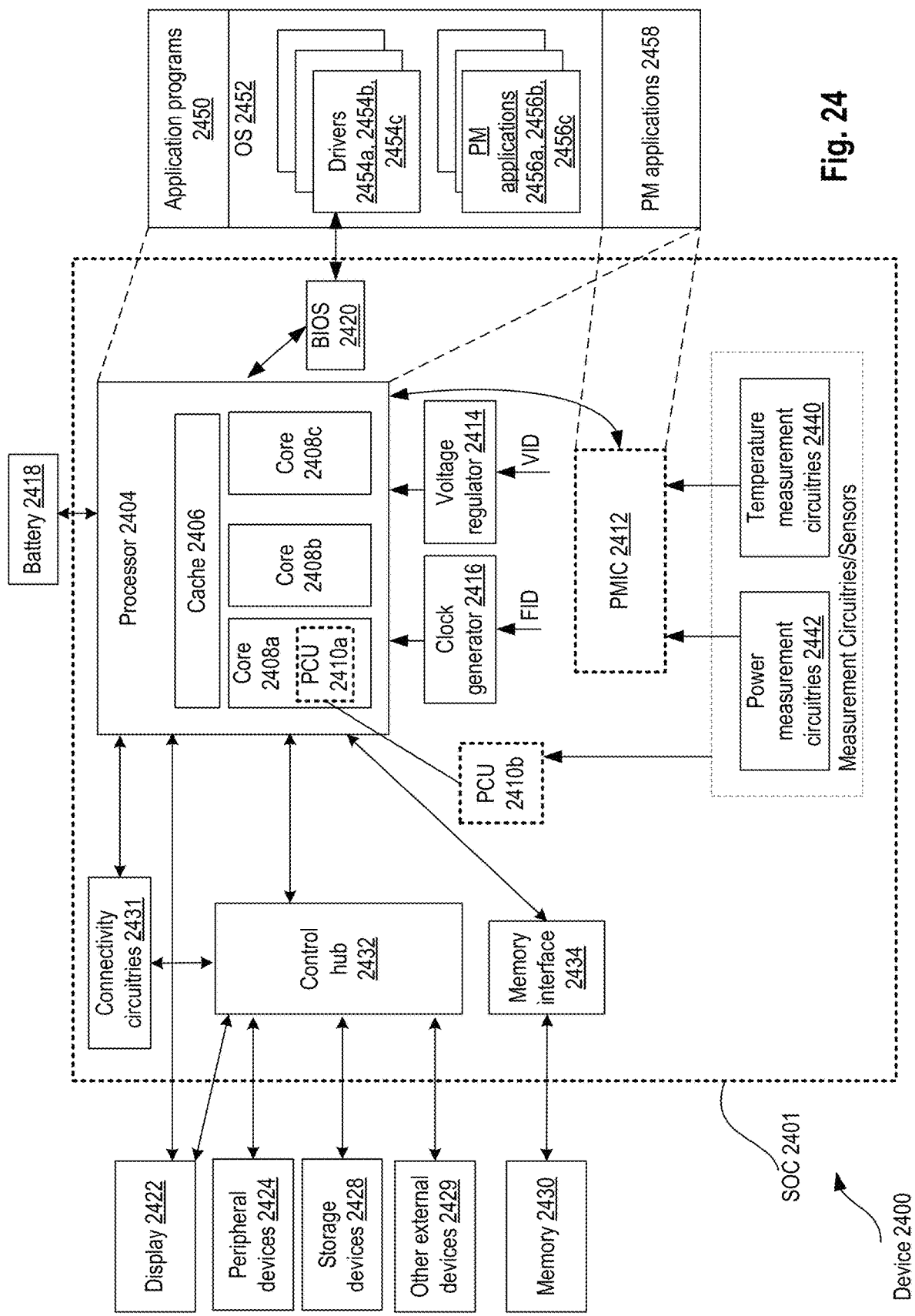

VARIABLE-ADAPTIVE INTEGRATED COMPUTATIONAL DIGITAL LOW DROPOUT REGULATOR

CLAIM OF PRIORITY

This Application is a National Stage Entry of, and claims priority to, PCT Patent Application No. PCT/US2019/050037, filed on Sep. 6, 2019 and titled "A Variable-Adaptive Integrated Computational Digital Low Dropout Regulator," which claims the benefit of priority to U.S. Provisional Patent Application No. 62/731,760, filed Sep. 14, 2018 and titled "A Variable-Adaptive Integrated Computational Digital Low Dropout Regulator," which is incorporated by reference in its entirety for all purposes.

BACKGROUND

Digital Low Dropout (DLDO) regulators have become an integral part of system-on-chip (SOCs) due to their ease of integration and their potential for enabling fine-grained power management. Digital LDOs enable the lowest drop-out and present an opportunity of turning a power gate into an LDO maximizing the potential for aggressive Dynamic Voltage Frequency Scaling (DVFS).

However, one of the fundamental drawbacks of the DLDO is non-linear variation of the power gate resistance due to its inherent quantization. This results in the bandwidth of the low dropout (LDO) regulator to vary by orders of magnitude across a wide dynamic range of DVFS. Even though proportional-integral (PI) controllers with variable gain boosting techniques have been implemented in literature, they are still limited in performance due to process-voltage-temperature (PVT) and other non-idealities. This fundamental aspect limits the applicability of digital LDOs in many DVFS applications as the settling times for different "di/dt" events is different making power management much more difficult.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 5 illustrates a table showing options for multiplexer of the CDLDO, in accordance with some embodiments.

FIG. 24 illustrates another smart device or a computer system or a SoC (System-on-Chip) with CDLDO regulator, according to some embodiments.

DETAILED DESCRIPTION

Figure 1:
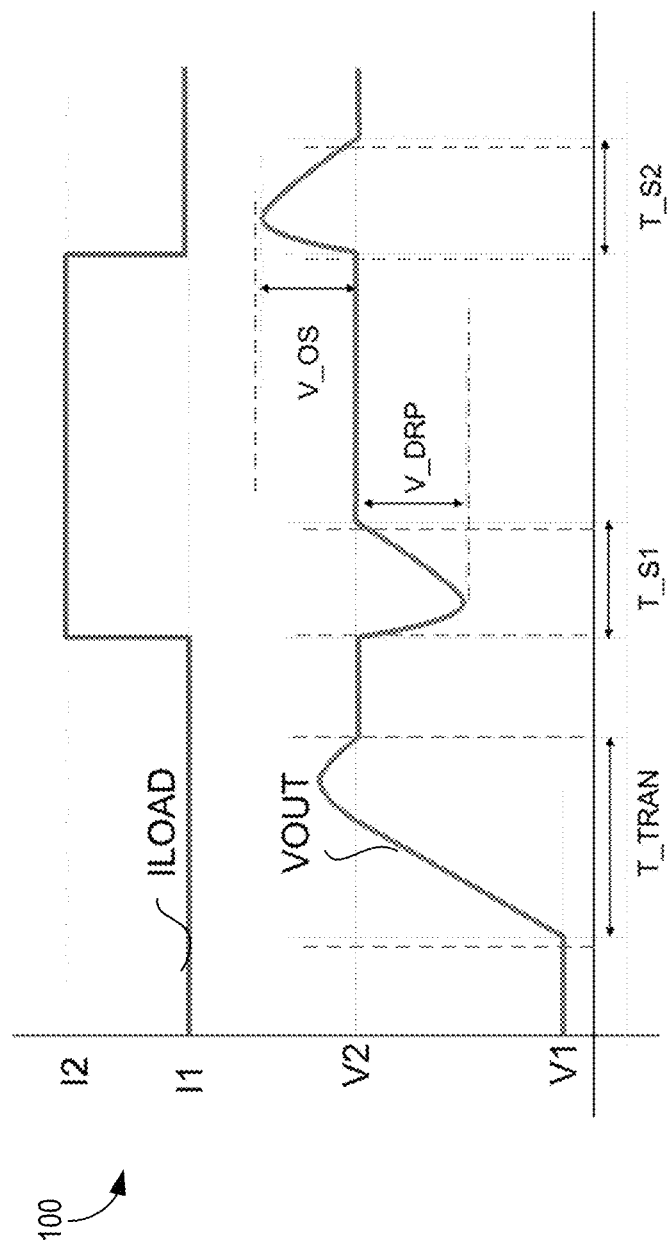
FIG. 1 illustrates a plot showing load current and output voltage with performance parameters.

DLDOs are expected to: (i) respond fast to large load (IL) transients to minimize voltage droops/overshoots; (ii) support quick output voltage (Vout) change and start-up with fast and deterministic settling time to enable effective DVFS (dynamic voltage and frequency scaling) and power state transitions; and (iii) minimize losses, output ripple and decoupling capacitance (cap) over a wide operating range. DLDO transient response is limited fundamentally by large variations in the linear controller loop bandwidth across a wide dynamic range due to nonlinear variations in the p-type power gate (PG) resistance. Transient response improvements via: (i) reduced dynamic stability; (ii) a PI controller with adaptive gain; and (iii) an event-driven control scheme that uses direct measurements of Vout transition times across pre-defined thresholds, along with the output load cap estimates, have been reported. A binary search based successive approximation scheme has been used to limit the Vout settling time to N event cycles (where N is a number of PG control bits), instead of 2N clock cycles in conventional control.

Various embodiments describe a Computational Digital Low Dropout (CDLDO) regulator that computes a required solution for regulating an output supply as opposed to traditional feedback controllers. The CDLDO regulator is Moore's Law friendly in that it can scale with technology nodes. For example, CDLDO regulator of some embodiments uses a digital approach to voltage regulation, which is orders of magnitude faster than traditional digital LDOs and enables regulation at GHz speeds, making fast dynamic DVFS a reality. The CDLDO also autonomously tunes out the effects of process-voltage-temperature (PVT) and other non-idealities making the settling time totally variation tolerant.

The CDLDO of various embodiments is better in performance (e.g., settling time) than traditional digital LDOs. For example, the CDLDOs of some embodiments computes an exact solution in two charge-discharge cycles, which are determined by the feedback system. As such, the CDLDO provides a consistent settling time for any reference or load transient. This technical effect itself is orders of magnitude better than traditional digital LDOs with PI or only integral control techniques. Here, solution generally refers to a power gate code which determines a number of enabled and disabled power gates coupled to Vout supply rail. The control scheme of the CDLDO autonomously tunes out the effects of PVT and other non-idealities (e.g., overshoot, voltage droop, etc.), making the settling time variation tolerant. The control scheme of the CDLDO provides a short cycle time (e.g., two-cycle settling time) independent of wake-up or step reference or step load across a wide dynamic range making the output response of the LDO very deterministic. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Here the term "digital LDO" generally refers to a circuitry that comprises an LDO architecture having at least one transistor, which is controllable by a rail-to-rail signal (e.g., a signal having a voltage level which is one of supply level or ground level). The rail-to-rail signal is also referred to as a digital signal. Here, the term "digital signal" generally refers to a sequence discrete signals which may have two possible values—a logic high value equal to a supply rail level and a logic low value equal to a ground rail level. A digital signal generally toggles rail-to-rail (e.g., from supply level to ground level).

Here, the term "analog LDO" generally refers to a circuitry that comprises an LDO architecture having at least one transistor, which is controllable by a non-rail-to-rail signal (e.g., a signal having a voltage level which is between a supply level and a ground level). The non-rail-to-rail signal here is also referred to as an analog signal. Here, the term "analog signal" generally refers to a continuous signal for which the time varying feature of the signal is a representation of some other time varying quantity. For example, an analog signal is a bias signal which has a continuous voltage level between a supply level and a ground level.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

It is pointed out that elements of figures having the same reference numbers (or names) as the elements of any other figure can operate or function in any manner similar to that described, but are not limited to such.

FIG. 1 illustrates plot 100 showing load current ($I_{LOAD}$) and output voltage (VOUT) with performance parameters. Here, T_TRAM is the shortest VID (voltage identification) transition time for the output voltage Vout is to switch from initial voltage V1 to final voltage V2. T_S1 is the shortest settling time for an under-shoot. T_S2 is the shortest settling time for an overshoot. V_DRP is the minimum voltage droop, and V_OS is the minimum over-shoot voltage.

Figure 2:
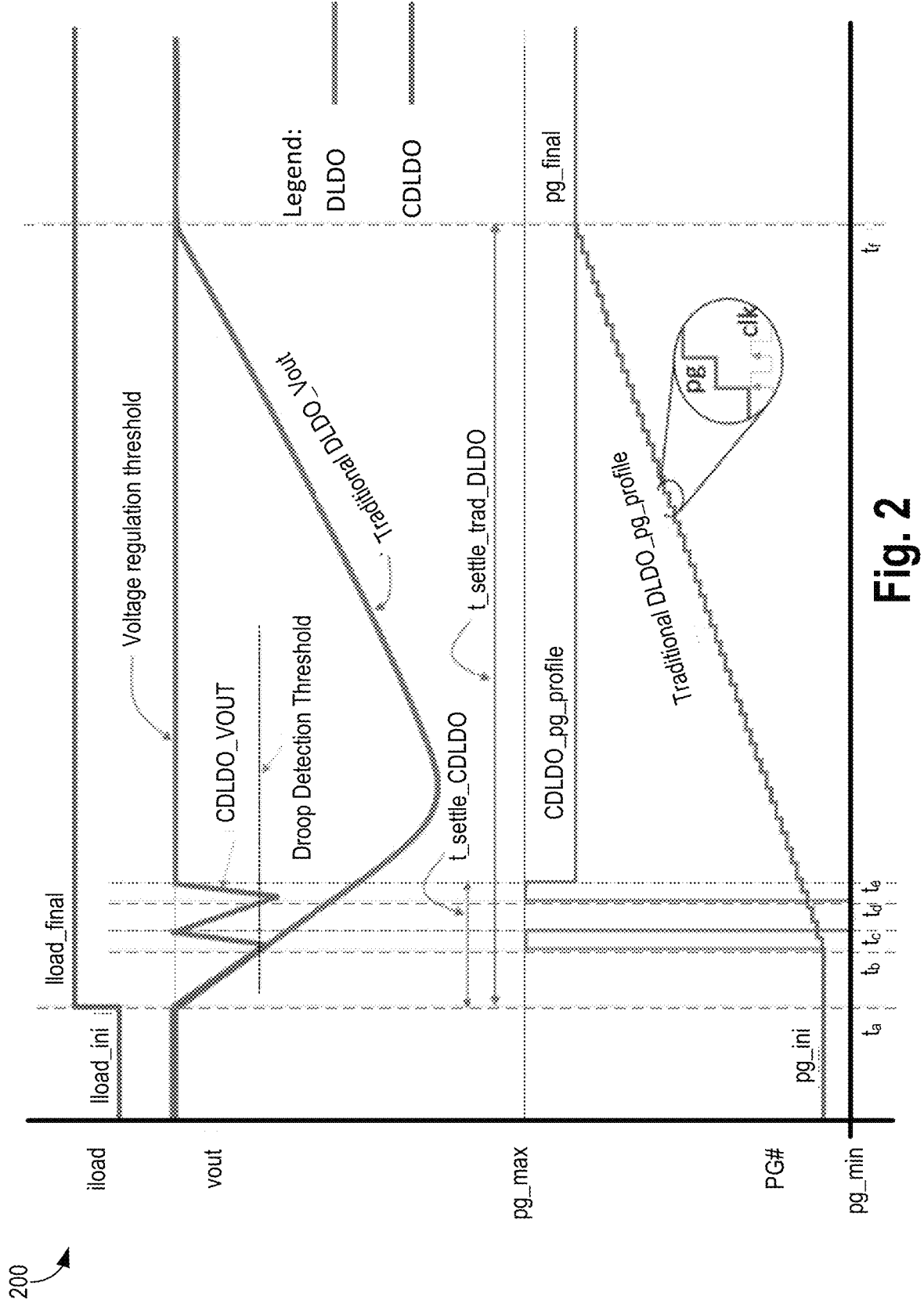
FIG. 2 illustrates a plot comparing performance of computational digital low dropout (CDLDO) regulator with a traditional DLDO during a load transient event, in accordance with some embodiments.

FIG. 2 illustrates plot 200 comparing performance of computational digital low dropout (CDLDO) regulator with a traditional DLDO during a load transient event, in accordance with some embodiments. Plot 200 shows a comparison of some embodiments with a traditional DLDO in terms a droop management when a load is applied.

In this example, prior to time-stamp ta, the system is stable with a load value of 'iload_ini' and a corresponding number of turned-on power gates 'pg_ini' (shown as power gate PG #). When the load is increased from 'iload_ini' to 'iload_final', power gates 'pg_ini' is no more sufficient; hence, the output voltage starts to drop. Once a voltage deviation is detected at the output of a traditional DLDO, the controller of such initiates a process to increase the number of turned-on power gate values. Most commonly used architecture allow the controller to increase the PG # by one at every clock edge (as shown in staircase of the inset figure). This increased PG # helps to pull back the voltage to the regulation level. This final value of PG #, required for the increased load demand (iload_final) is 'pg_final'. Hence, in a traditional DLDO it will take approximately 'N' cycles of clock, where 'N' is the difference of 'pg_final' and 'pg_ini'.

While traditional DLDO changes the PG # one at every clock cycle, the CDLDO of some embodiments reaches the final solution via a non-linear approach. Once CDLDO detects the event, the computational DLDO (CDLDO) system initiates a specific set of operations, which allows the controller to measure the amount of applied load current and compute the required solution (pg_final) far more quickly than the traditional DLDO. Here, the CDLDO settling time (t_settle_cdldo) is much less than the traditional DLDO (t_settle_trad_dldo). Note that the 'pg_ini' and 'pg_final' are same for both traditional DLDO and CDLDO.

Another superiority of the CDLDO is, with different load steps, the settling time remains largely fixed, since the system defined events and the required computation time are independent of load steps. In contrast, for a traditional DLDO, higher load step produces longer settling time.

Figure 3A:
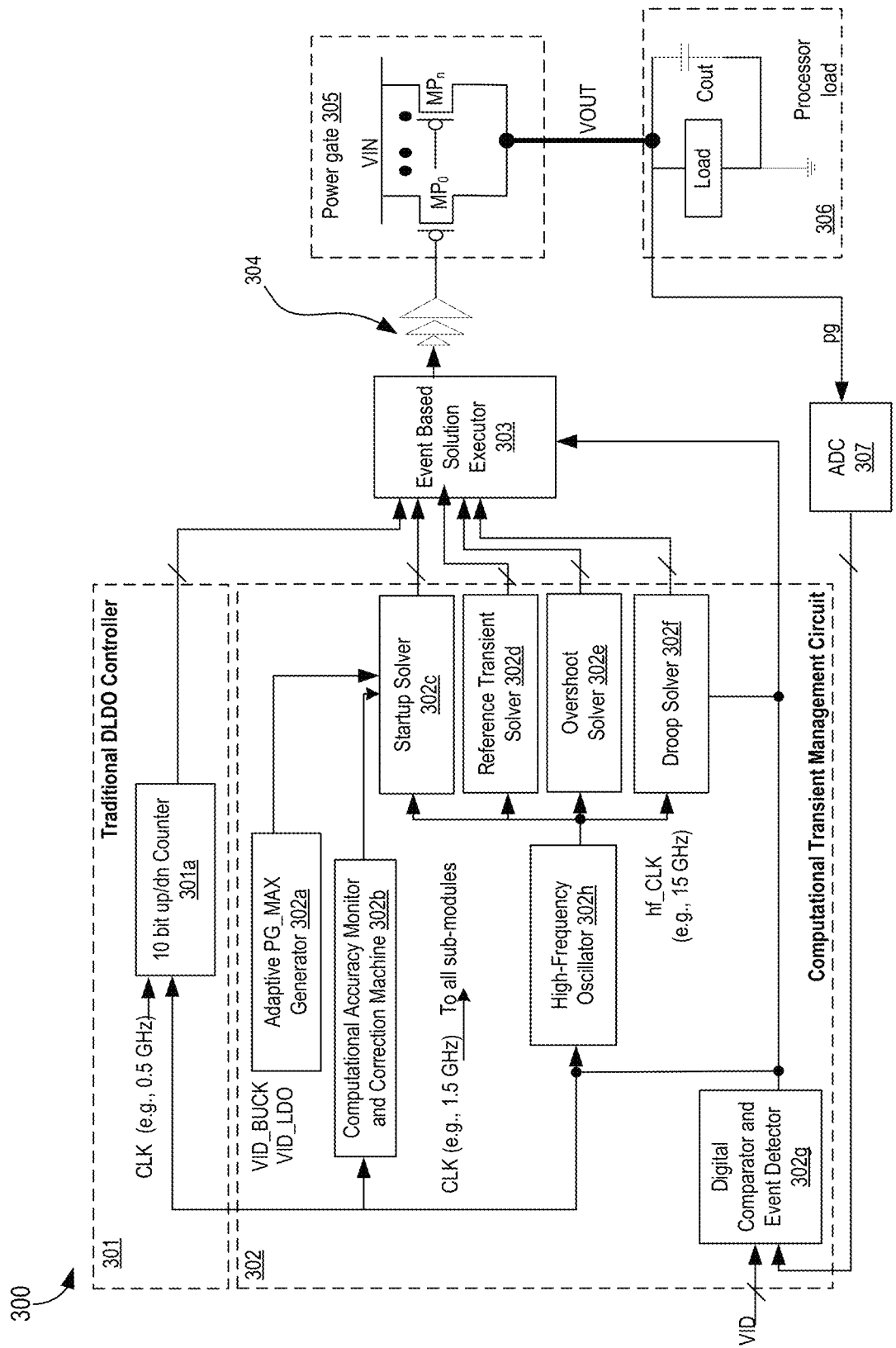
FIGS. 3A-C illustrate schematics of the CDLDO, in accordance with some embodiments.
Figure 3B:
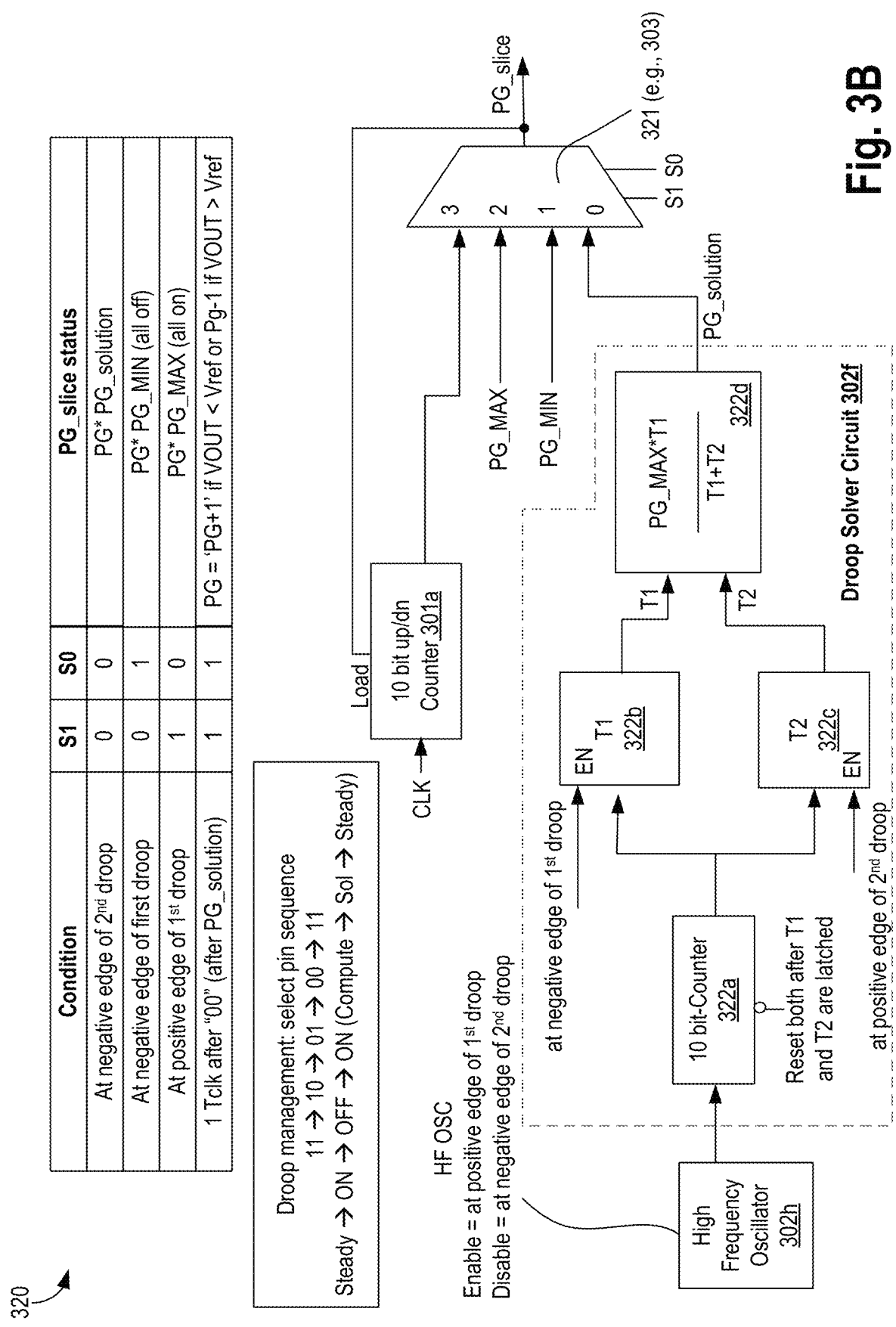
Figure 3C:
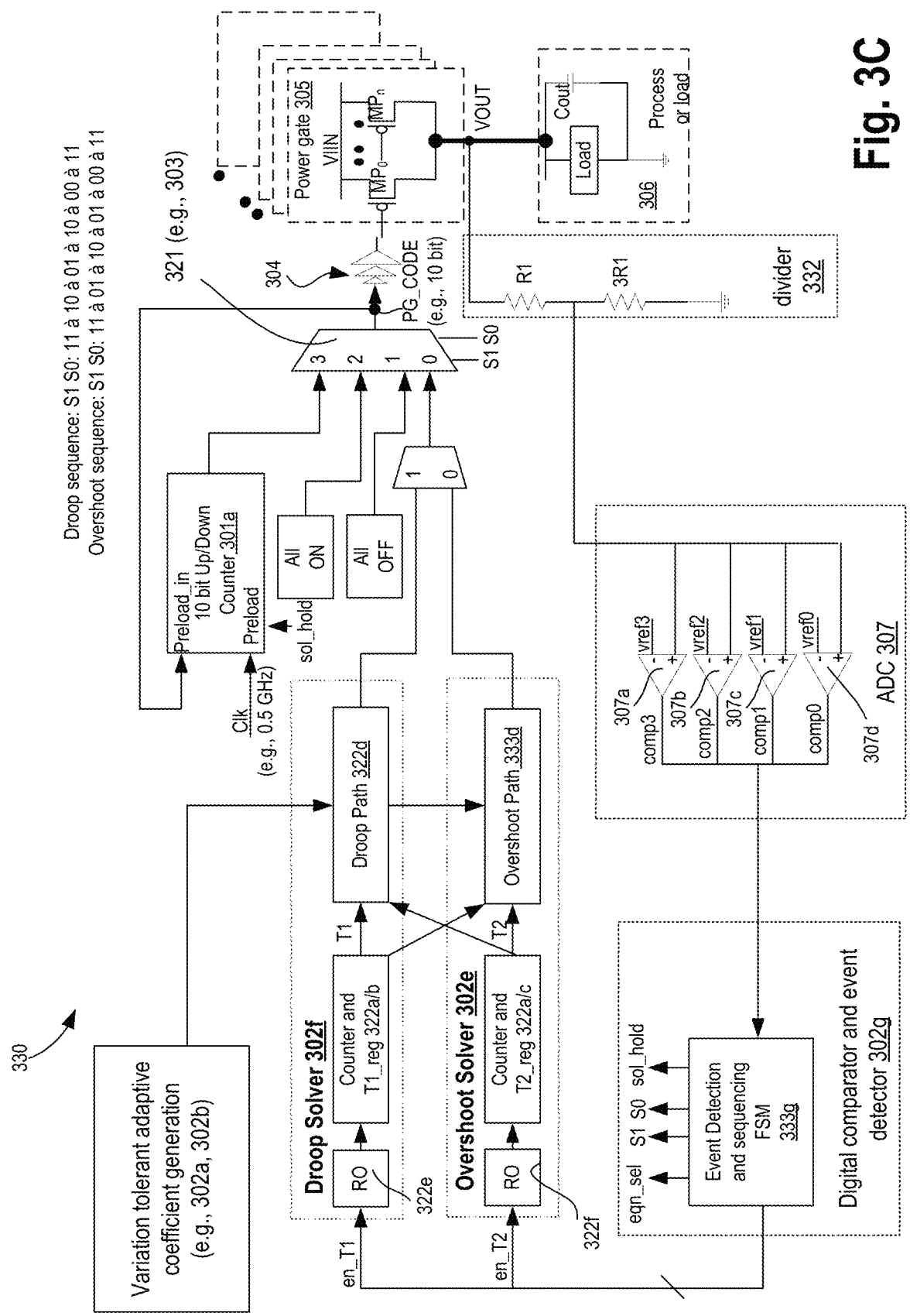

FIGS. 3A-C illustrate schematics 300, 320, and 330, respectively, of the CDLDO, in accordance with some embodiments. FIG. 3B describes portions of a droop solver 320 (e.g., 302f) of the CDLDO while FIG. 3C describes the overall CDLDO architecture. The schematics are also better understood in view of plots of FIGS. 4A-D.

CDLDO 300 comprises a traditional DLD controller 301, computational transient management circuit 302, event based solution executor 303, buffers 304, power gate (PG) 305 coupled to load 306, analog-to-digital converter (ADC) 307, and/or voltage divider (not shown in CDLDO 300).

In some embodiments, traditional DLDO controller 301 comprises an up/down counter 301a. For example, up/down counter 301a comprises a 10-bit counter. However, any suitable size for counter 301a can be used.

In some embodiments, computational transient management circuit 302 (or controller 302) comprises adaptive PG maximum (MAX) generator 302a, computational accuracy monitor and correction machine 302b, startup solver 302c, reference transient solver 302d, overshoot 302e, droop solver 302f, high-frequency oscillator 302h, and digital comparator and event detector 302g.

In various embodiments, PG 305 comprises a plurality of power gates (e.g., 0 though n, where 'n' is an integer) coupled in parallel. The power gates comprises p-type transistors $MP_0$ to $MP_n$. While the schematic shows single p-type transistors coupled to input power supply rail Vin and output power supply rail Vout, other configurations are also possible. For example, series coupled p-type transistors (e.g., coupled between Vin and Vout) can be used for each PG leg. In some embodiments, the size of the power gates are binary weighted. In some embodiments, the size of the power gates are thermometer weighted. The power gates are coupled to an input power supply rail Vin and an output power supply rail Vout.

In some embodiments, ADC 307 digitizes the output voltage pg from load 306 and provide a digital output to comparator and event detector 302g. The output voltage pg may also be a divided down voltage. For example, a voltage divider can be used to divide down the voltage on Vout before it is used as input by ADC 307. The output pg is an analog signal and the output of ADC is a digital output signal. An analog signal is any continuous signal for which the time varying feature (variable) of the signal is a representation of some other time varying quantity, i.e., analogous to another time varying signal. A digital signal is a physical signal that is a representation of a sequence of discrete values (a quantified discrete-time signal), for example of an arbitrary bit stream, or of a digitized (sampled and analog-to-digital converted) analog signal.

ADC 307 is an apparatus that converts continuous physical quantities (e.g., analog voltages) to digital numbers that represent the amplitude of the physical quantities. In some embodiments, ADC 307 converts the analog pg on node Vout to its corresponding digital representation. Any suitable ADC may be used to implement ADC 307. For example, ADC 307 is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC.

In some embodiments, comparator 302g compares the sensed output voltage on Vout with a digital VID. VID is a voltage identification, which is generally a multi-bit signal that indicates the desired or target voltage supply level for Vout. VID may be generated by an external power management integrated circuit (PMIC) or an internal on-die power management circuitry. The output of comparator 302g is used to trigger counting up or down of counter 301a. For example, when the voltage on Vout is below the target VID level, then comparator 302g instructs counter 301a to count up and turn on more power gate transistors in PG 305. Counter 301a operates at a lower frequency than other modules of circuit 302. For example, clock frequency for counter 301a is about 0.5 GHz while the high frequency clock from oscillator 302h is about 1.5 GHz. The output of oscillator 302h is provided to startup solver 302c, reference transient solver 302d, overshoot solver 302e, and droop solver 302f.

The output of comparator 302g is also received by computational accuracy monitor and correction machine 302b, high-frequency oscillator 302h, droop solver 302f, and event based solution executor 303. In various embodiments, digital comparator and the event detector 302g also monitors the output voltage for specific events droop, overshoot, reference transient and startup. Droop event occurs when voltage on Vout drops below a threshold. It generally occurs when processor (e.g., load 306) starts up and draws a large initial current. Overshoot event occurs when voltage on Vout suddenly rises above a normal (or target) voltage level. Overshoot can be a reaction to voltage droop. Long duration of overshoot can overstress transistors resulting in reliability issues for processor (or load 306). Reference transient and startup events refer to initial ramp up of Vout.

Here the term reference refers to a voltage set point or a target voltage for the microprocessor (or load 306). The voltage regulator brings the output voltage to a given reference value or the voltage set point. Here the term reference transient refers to a dynamic movement of a given reference value. For example, a microprocessor may be working at 0.8V (lower reference value) at one time and the next moment, for higher performance, the operating system may instruct the microprocessor to go to a higher reference value (e.g., 1.2V). During the transition, the voltage regulator receives the new reference set point and tries to bring the output voltage to a new set point, reference transient. During startup, the reference set point typically jumps from an off condition (e.g., 0V) to a typical operating value (e.g., 1V) and hence it inherently behaves just like another reference transient event.

Any time an event occurs (e.g., droop, overshoot, reference transient, startup), event detector 302g turns on the corresponding circuit path for the event. For example, when a droop happens, droop solver 302f path gets activated along with high frequency oscillator 302h. Upon calculating the exact solution (e.g., number of PG to be enabled and disabled), the system applies the solution to the power stage 305 and the system settles with the new power gate values (e.g., values indicating which power gate transistors are turned on or off). If the applied load 306 is smaller such that it does not produce any droop or overshoot on Vout, the system corrects itself via the traditional up/down counter 301a, which too receives the command from comparator 302g.

Startup solver 302c is similar to the reference transient solver 302d. While a startup event is similar to the other transient event, since prior to startup the output voltage is typically 0V, the controller handles the startup slightly different than the other reference transients. During startup, the controller turns on the power gate slowly, one bit at a time, until the voltage reaches the 75% (or another predetermined or threshold) of the target reference value. After that the regulator computational controller takes over, it behave identical to any other reference transient event. This slow turn on prevents inrush current which might otherwise degrade the reliability of the transistors.

Similarly, when a reference transient is detected, the reference transient solver path 302d is activated. The same is true for overshoot and start up paths. In some embodiments, reference transient solver 302d behaves similar to droop solver 302f. An upward reference transient triggers a droop event and a downward reference transient triggers an overshoot event, and thus corresponding computational engines are invoked. The reference transient solver 302d correctly identifies the type of the reference movement and invokes the right computational engine.

The CDLDO of some embodiments features an event-driven computational controller (CC) 302 that is automatically activated on detection of a large droop or overshoot event on Vout triggered by large load transients in load 306. Here, signal names and node name are interchangeably used. For example, Vout may refer to node Vout (or power supply rail) or signal Vout depending on the context of the sentence.

In various embodiments, CC 302 measures Vout transient dynamics and computes the PG code (which is applied to power gate 305) to stabilize the output voltage Vout. In some embodiments, nonlinear control via full-strength clamping/unclamping of Vout (e.g., by turning on all power gate transistors), is invoked during this measurement and computation, to guarantee that the maximum allowed Vout droop/overshoot is not exceeded even for the worst-case transient. In some embodiments, impacts of process and slow runtime variations on computation of the correct PG code are mitigated via adaptive tuning of the code computation coefficients. In various embodiments, small and slow load transients, as well as steady state Vout regulation with minimal ripple are handled by a conventional high-frequency synchronous digital linear controller (LC) 301.

In some examples, the CDLDO implements a 10-bit binary weighted, 5-slice PG array 305 delivering a maximum 2 A load current at 25 mΩ minimum turn-on resistance (RON). The voltage on Vout is sampled via a resistive divider R1 and R2 (e.g., 0.75× gain) of voltage divider 332 and fed into ADC 307. In his example, ADC 307 comprises four comparators 307a through 307d with reference values Vref0 to Vref3 set by four identical DACs (not shown). A DAC is an apparatus that converts digital data (e.g., binary or thermometer coded) into an analog signal (current, voltage, or electric charge). In some embodiments, DAC is a pulse width modulator DAC. In other embodiments, other types of DACs may be used for implementing the DAC. For example, interpolating DACs (also known as oversampling DACs), binary weighted DACs (e.g., switched resistor DACs, switched capacitor DACs, switched current-source DACs), R-2R ladder DAC, thermometer coded DAC, segmented DAC, etc. may be used for implementing the DAC. Any suitable DAC may be used for implementing the DAC. While the embodiments illustrates four comparators, any number of comparators can be used to implemented ADC 307 to achieved a desired resolution of the analog signal in its digital representation.

In some embodiments, an event detection and sequencing finite state machine (FSM) 333g uses the comparator outputs (e.g., comp0 through comp3) to determine the operating zone (e.g., zones[1]-[5] of FIG. 4B), and detects onset of large droop/overshoot events. If Vout enters zone 1 or 5, FSM 333g activates computational control by enabling two high-frequency oscillators (RO) 322b/c running asynchronously. Oscillators 322b/c can be 5-state or any suitable stage oscillator to generate the desired frequency.

A high-frequency counter 322a/b or 322a/c uses the RO pulses to count durations $T_1$ and $T_2$ generated by in-situ measurements of Vout transient dynamics. These durations $T_1$ and $T_2$ are provided to droop path 322d and overshoot path 333d. The compute engine 322d uses $T_1$ and $T_2$ to produce the correct PG code (PG_slice) that stabilizes the voltage on Vout. A conventional high-frequency linear up/down counter 301a provides regulation in zones 2 and 4 for small/slow transients, and in zone 3 for steady-state operation. In various embodiments, control signals (S1, S0)

for the multiplexer 321 (e.g., 10b 4-to-1 multiplexer) are asynchronously generated by FSM 333g to drive the correct PG codes to power stage 305.

In some embodiments, CC 302 uses two event cycles for in-situ measurements of $T_1$ and $T_2$ during large load/unload transients or reference voltage step up/down events, and computes the correct PG code. Ratio-metric computation of the PG code ensures that it is not vulnerable to any load capacitance estimate or absolute time measurement inaccuracies, thus enabling robust operation in the presence of workload-dependent load cap variations at runtime.

At the onset of a large droop event, for example, FSM 333g turns all PGs ON to drive Vout to the regulation zone 3 in time $T_1$. Then, it turns OFF all PGs, causing Vout to cross the droop threshold in time $T_2$. FSM 333g then turns all PGs ON again to bring Vout back to the regulation zone. $T_1$ and $T_2$ values are captured during the first and second Vout transitions, respectively, by registers. The PG code used to stabilize Vout is computed using $T_1$, $T_2$ and an adaptive multiplier coefficient that is tuned to compensate for process and slow runtime variation impacts on the correctness of the computed PG code.

The pipelined compute engine begins the computation as soon as $T_1$ is measured in the first cycle. CC 302 drives the PG code directly for two cycles and then hands over control to LC 301, which automatically corrects any small inaccuracy that may be present in the computed PG code due to quantization errors or inaccurate measurements, and helps settle it to the correct value in a few more clock cycles without triggering a new event. Since the computation uses $T_1/T_2$ ratio, accurate measurement of absolute time values may not be acute, and linearity requirements of the high frequency ROs can be relaxed. Large Vout overshoot events and reference voltage step up/down transients are also handled in a similar manner by CC 302. The high frequency ROs are activated by FSM 333g during a large transient event to improve steady-state current efficiency. In addition, CC 302 enables usage of a simple up/down counter as LC 301.

A smooth handover of the PG code from asynchronous CC 302 to the synchronous high frequency LC 301 is implemented by generating an asynchronously set, synchronously reset sol_hold signal, set at the negative edge of the second event cycle, and enabling a clock pulse counter at the same time. PGs 305 are then held at the computed PG code for some clock cycles (e.g., 2 clock cycles) while it is pre-loaded into the synchronous LC counter, ensuring that the counter is fully flushed with the correct code after the clock pulses (e.g., 2 clock pulses), thus resolving any meta-stability due to clock-crossing. The signal sol_hold is reset after the clock pulses (e.g., 2 clock pulses), and LC 301 starts driving PGs 305 with the PG code already pre-loaded from CC 302.

Effectiveness of CC 302 across process and slow runtime variations, and for smaller dynamic ranges in low power states, is maintained by dynamically adjusting the multiplier coefficients α_drp (droop coefficient) and α_os (overshoot coefficient) used for PG code computation, based on event history. If an event recurs during a programmable timeout period, the coefficient is adjusted by a predetermined or programmable amount (e.g., 10%). The new coefficient is retained and used in subsequent events, or adjusted again on detection of another event within the timeout window. It can also be pre-configured for reference step up/down transitions to minimize computation overheads.

FIG. 4A-E illustrate plots 400, 420, 430, 440, and 450 respectively showing output voltage response of CDLDO relative to a traditional DLDO and various thresholds, in accordance with some embodiments.

Figure 4A:
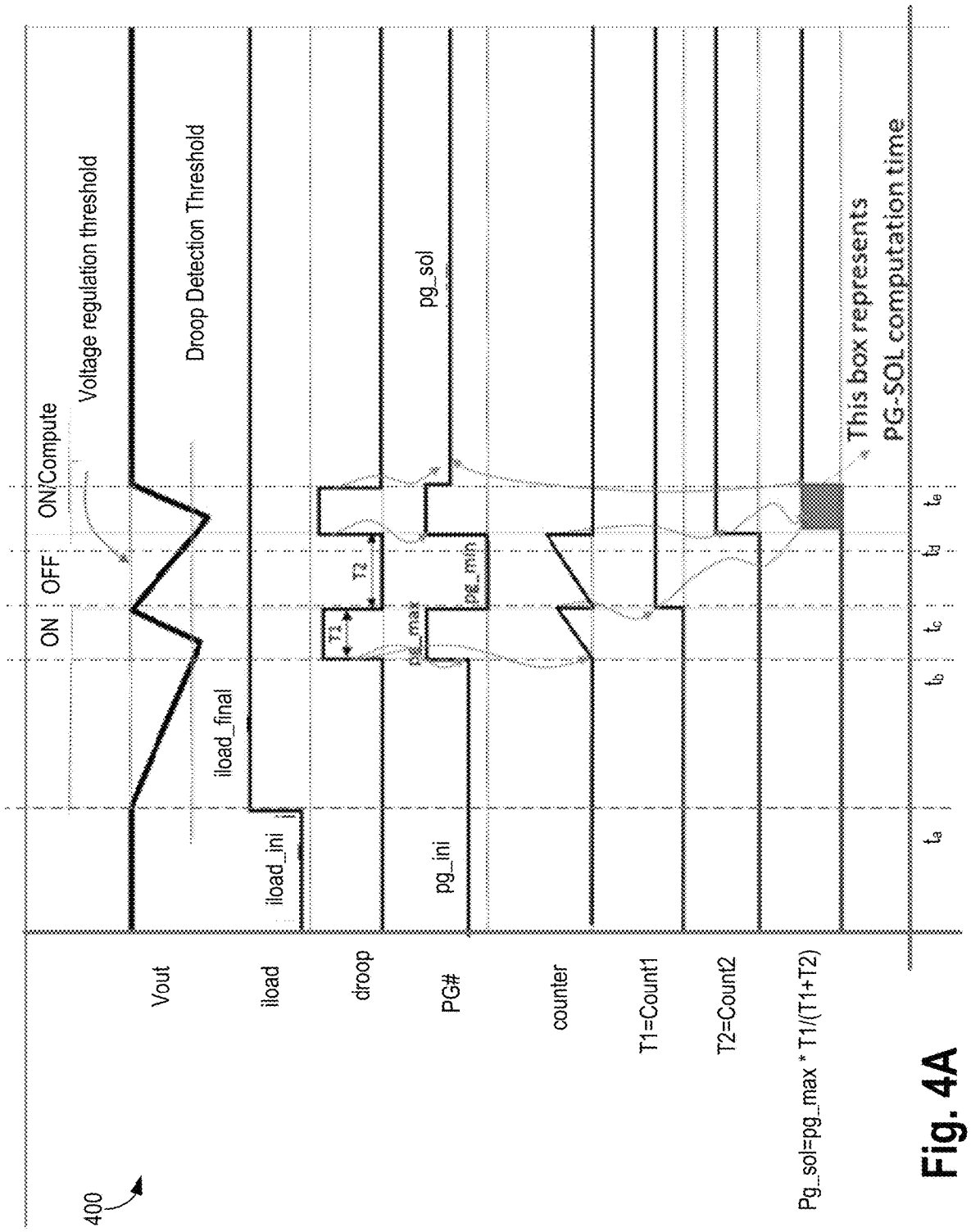
FIGS. 4A-E illustrate plots showing output voltage response of CDLDO relative to a traditional DLDO and various thresholds, in accordance with some embodiments.
Figure 4B:
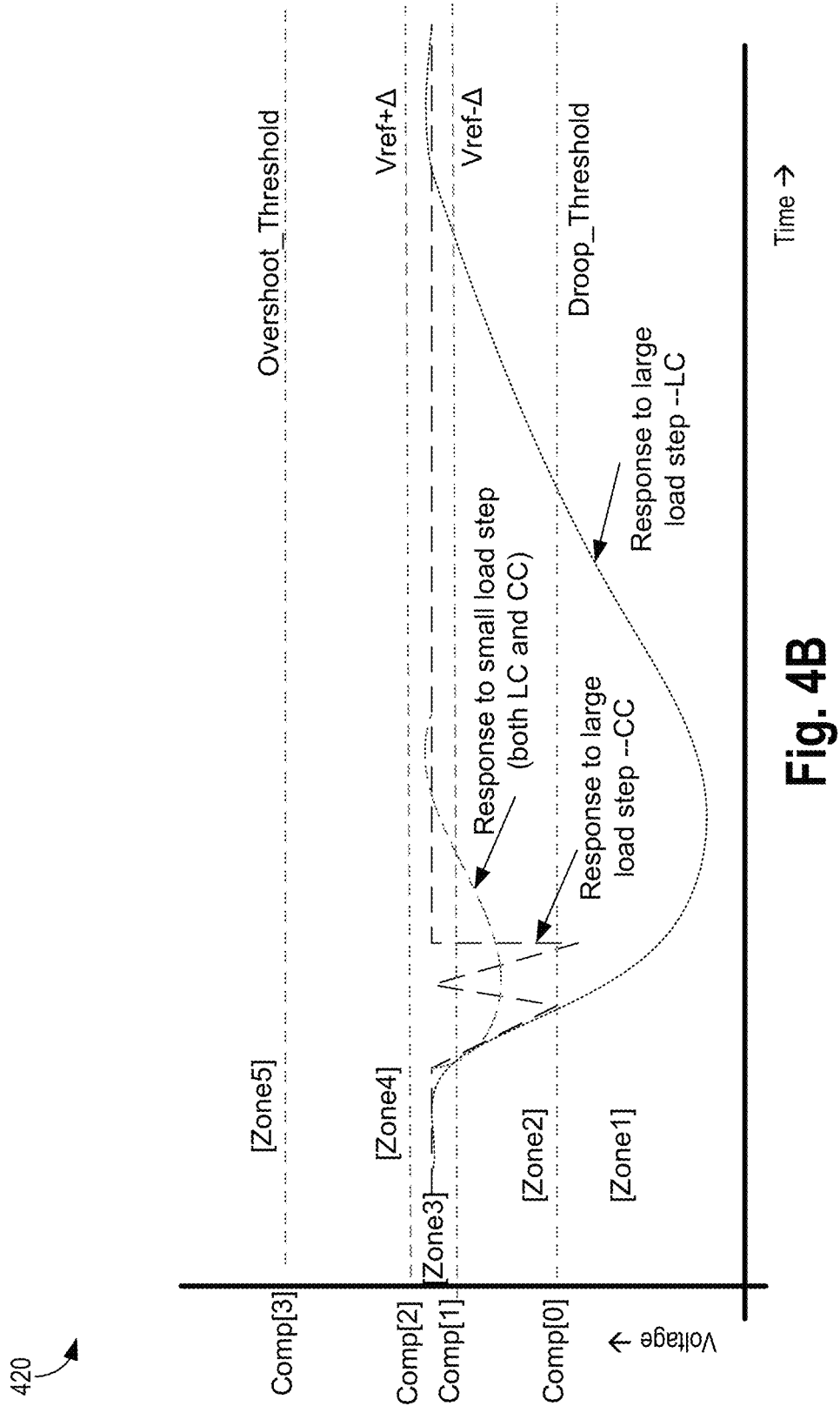
Figure 4C:
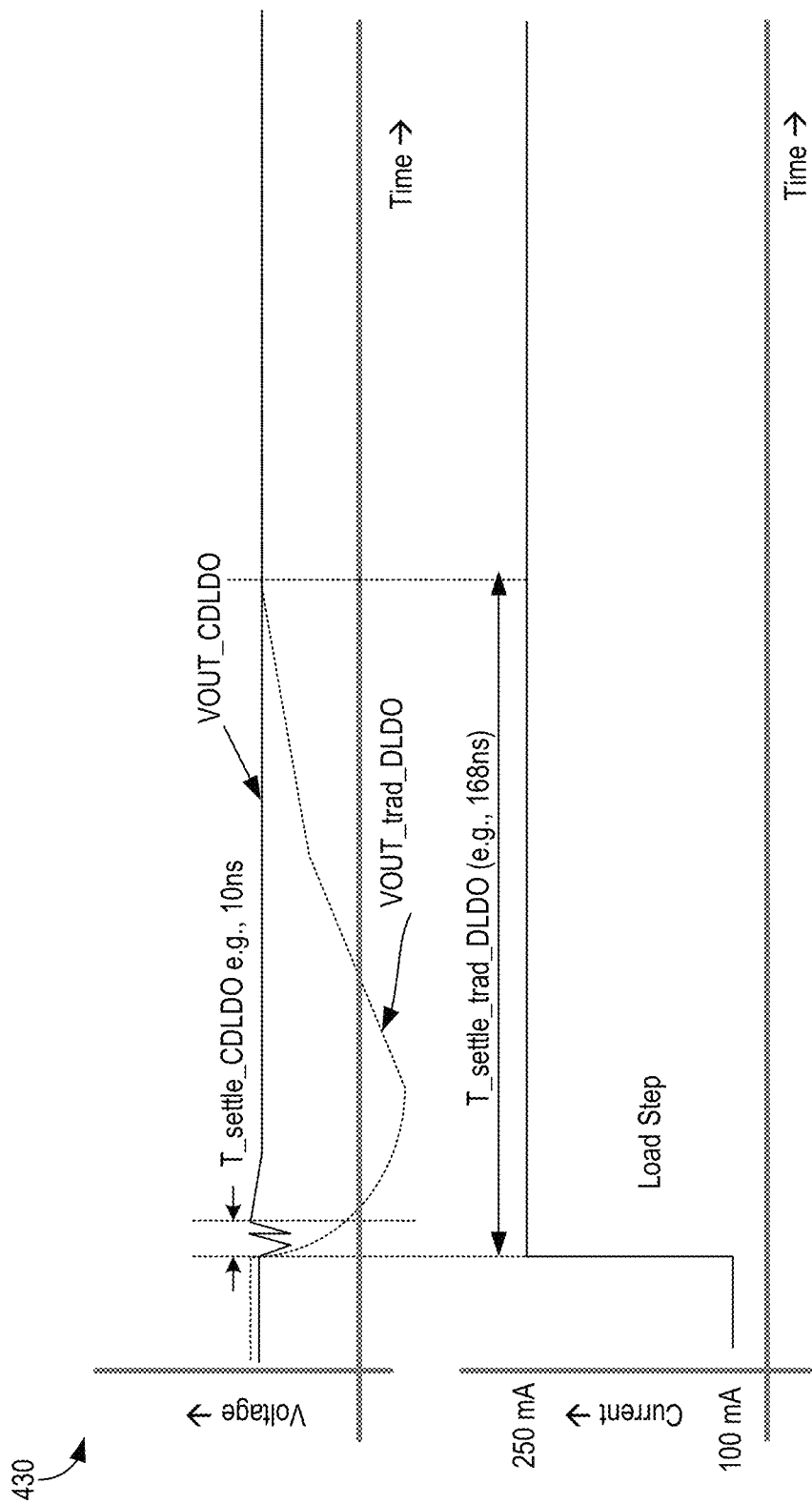
Figure 4D:
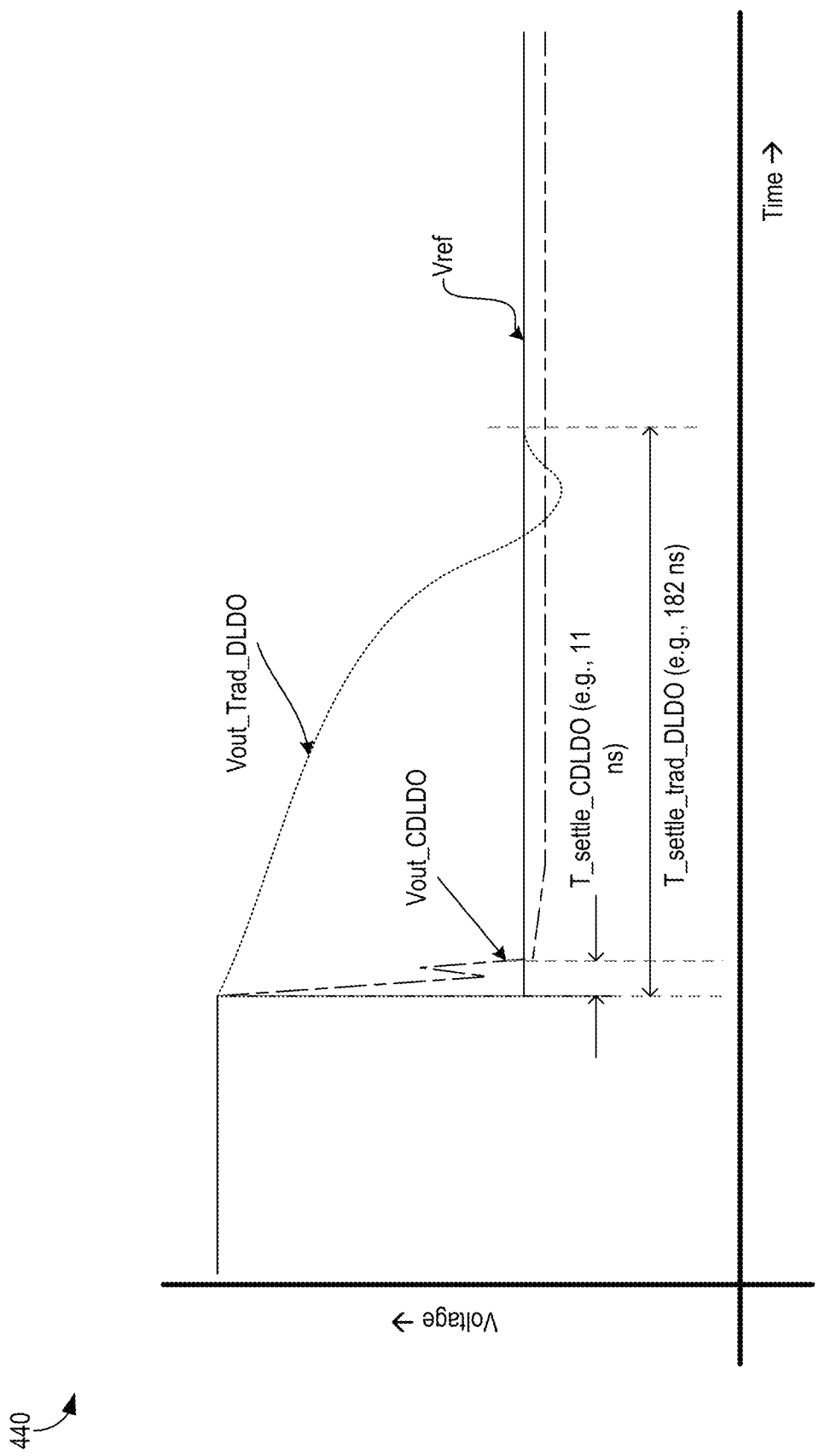
Figure 4E:
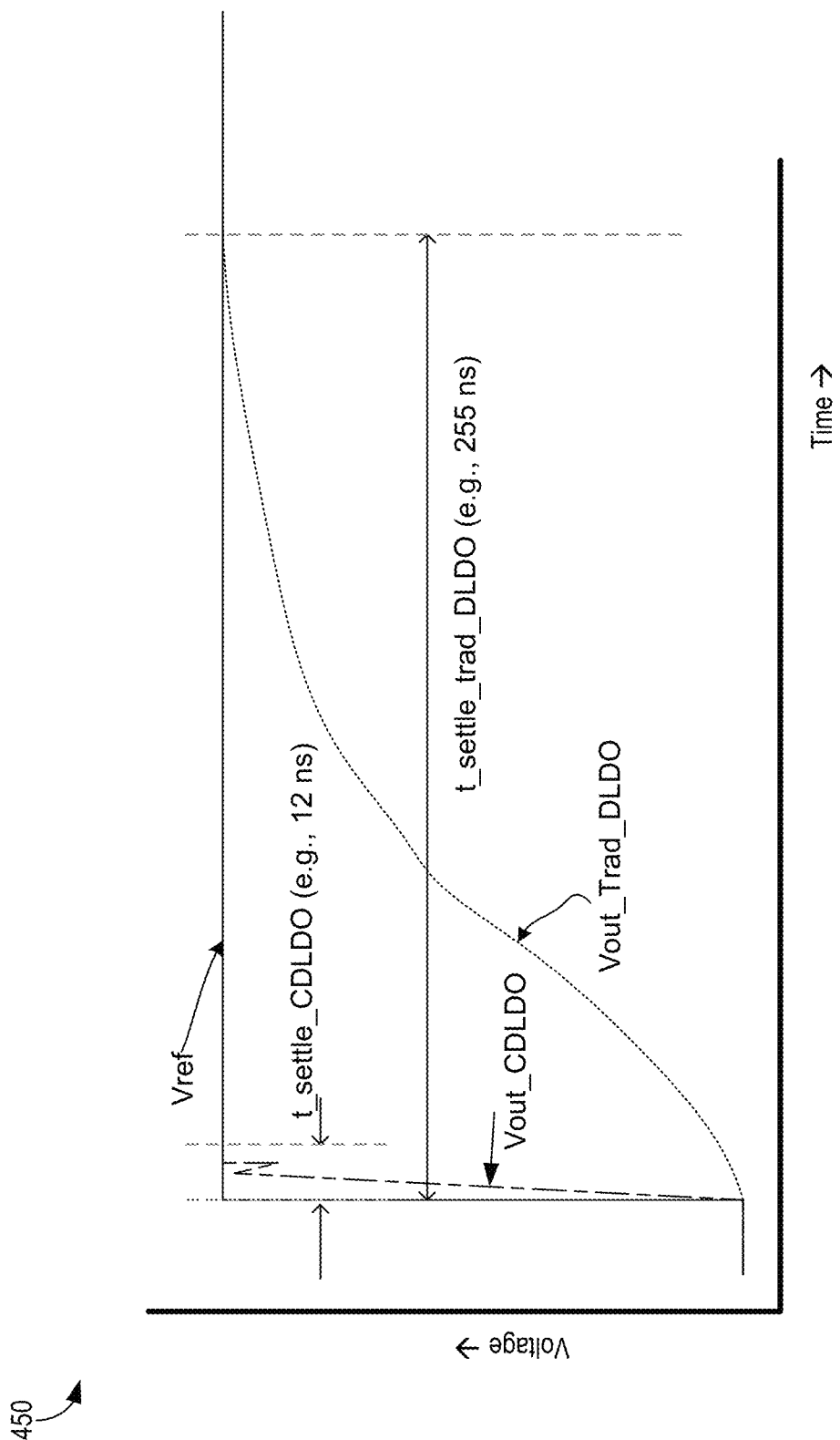

With reference to FIG. 4A, at $t_a$ the load is applied. The output voltage $V_{OUT}$ drops and crosses the droop detection threshold at $t_b$ and is detected by comparator 302g. In this case, FSM 333g causes multiplexer 321 to select option 2 which turns on the power stage 305 with full strength ('pg_max'=all on). Because, 'pg_max' is by design stronger than the applied load, the output voltage Vout reverses direction and goes up. The effective current that charges the output capacitor Cout during this time is I(pg_max)−iload.

Once the regulation level is reached at $t_c$, the system applies the minimum power gate strength ('pg_min'=all off). In this case, FSM 333g causes multiplexer 321 select option 1, which turns off the power stage 305. The output voltage Vout starts falling under the load. The effective current that discharges the output capacitor Cout during this time is iload. At $t_d$, when the droop is detected for the second time, 'pg_max' is applied again by multiplexer 321 (via FSM 333g) and upon reaching the regulation level, the solution is applied. The solution is achieved by sampling the high frequency counter values during $t_b$ to $t_c$ (counter value is $T_1$) and during $t_c$ to $t_d$ (counter value is $T_2$). Arithmetic unit 322d computes the solution from the following equation: Pg_sol=pg_max*T1/(T1+T2).

Measurements show closed loop load regulation of the CDLDO in the baseline LC mode for 0.5-1.0V Vout and 0.6-1.2V Vin for 0.4-250 mA load current transients with minimal steady-state output ripple. Measurements at 1.2V VIN, with the LC operating at 500 MHz, show that the CDLDO automatically detects large 0.15/0.4/0.5 A, 2 A/ns load/unload transients, performs 2-cycle in-situ T1 and T2 measurements, computes and drives the correct PG code to limit peak Vout droop/overshoot to 100 mV/100 mV, compared to 670 mV/350 mV in the linear mode. The Vout settling time is within 20 ns, demonstrating high loop bandwidth and seamless handoff between computational and linear modes. Furthermore, the CDLDO responds within 2 cycles with approximately the same settling time (e.g., less than 20 ns) for different load transients, while the settling time is up to 20× longer in the linear mode.

Start-up and step down/up reference transients are 5× faster in the CC mode with dV/dt>30 mV/ns. A 1 A-100 mA step unload transient shows large VIN overshoot triggered by input PDN resonance, and the CC responds much faster than the resonant frequency. Successful dynamic adaptive tuning of the multiplier coefficients is also demonstrated across a series of reference step transient events. Comparisons with other DLDOs show significant improvements in transient response, settling time and FOM.

FIG. 5 illustrates table 500 showing options for multiplexer 321 of the CDLDO, in accordance with some embodiments. During a voltage droop, control signals S1 and S0 of multiplexer 321 select linear controller (LC) 301 by applying code 1,1 to S LSO. Thereafter, multiplexer 321 control signals S1 and S0 select S1,S0 as 1,0 to turn on all PGs 305. Then, control signals S1 and S0 of multiplexer 321 select S1,S0 as 0,1 to turn off all PGs 305. Then control signals S1 and S0 of multiplexer 321 select S LSO as 1,0 to turn on all PGs 305. Then control signals S1 and S0 of multiplexer 321 select S1,S0 as 0,1 to turn off all PGs 305. As such, two cycles of turning on and off the PGs 305 is performed. Then multiplexer 321 passes the control to the linear controller (LC) 301 by selecting S1,S0 as 1,1.

During an over-shoot event, control signals S1 and S0 of multiplexer 321 select linear controller (LC) 301 by applying code 1,1 to S1,S0. Thereafter, control signals S1 and S0 of multiplexer 321 selects S LSO as 0,1 to turn off all PGs 305. Then, control signals S1 and S0 of multiplexer 321 selects S1,S0 as 1,0 to turn on all PGs 305. Then the multiplexer control signals S1 and S0 selects S1,S0 as 0,1 to turn off all PGs 305. Then control signals S1 and S0 of multiplexer 321 selects S1,S0 as 1,0 to turn off all PGs 305. As such, two cycles of turning off and on the PGs is performed. Then multiplexer 321 passes the control to the linear controller (LC) 301 by selecting S1,S0 as 1,1.

Figure 6:
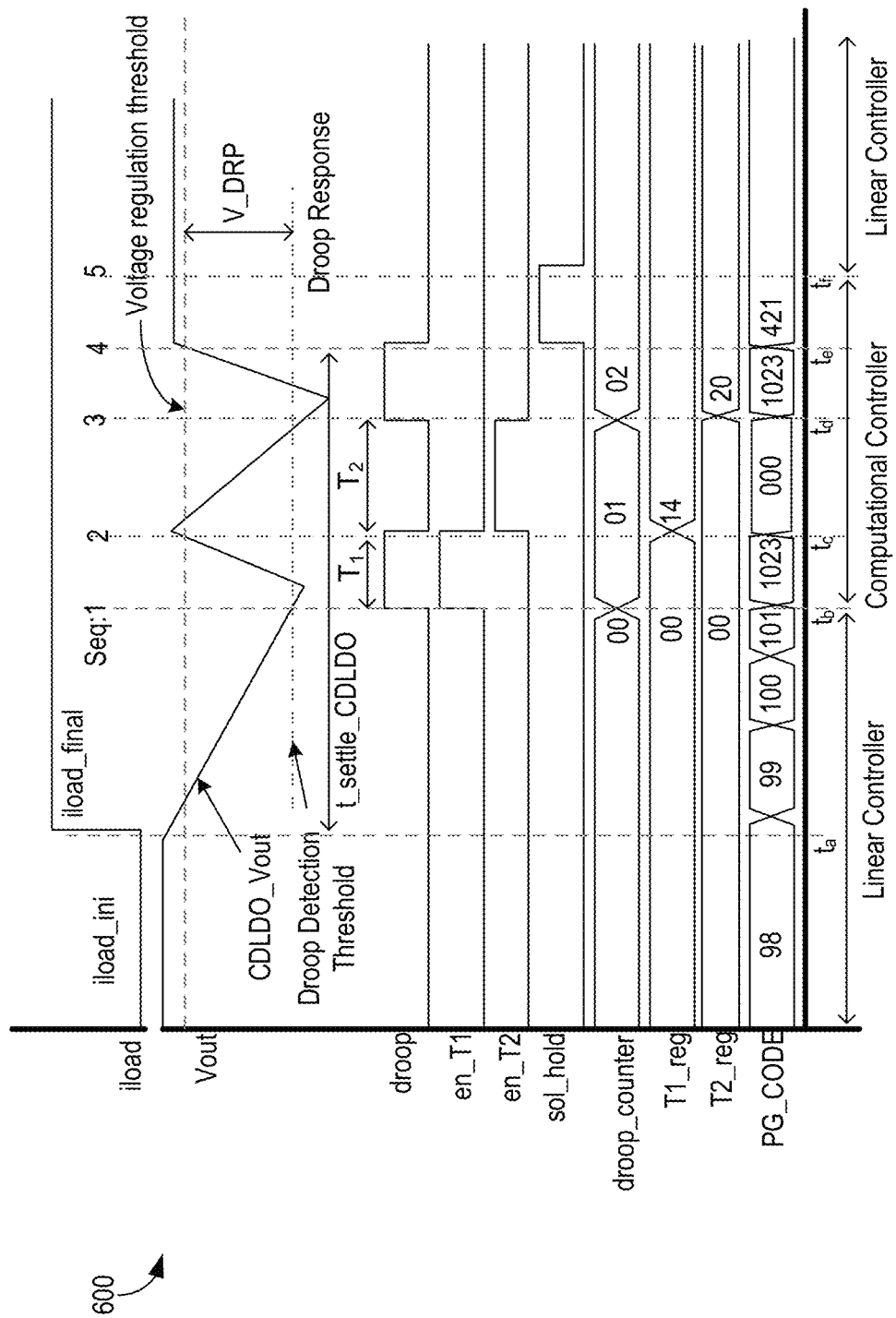
FIG. 6 illustrates a plot showing transient response of the CDLDO, in accordance with some embodiments.

FIG. 6 illustrates plot 600 showing transient response of the CDLDO, in accordance with some embodiments. During $T_1$, all power gates are ON. During $T_2$, all power gates 305 are OFF. The output capacitor Cout charging current during $T_1$ is $I_{MAX}$ less $I_{LOAD\_FINAL}$. Amount of charge ($Q_1$) output received is defined by:

$$Q_1 = V_{DRP} * C_{out} = (I_{MAX} - I_{LOAD\_FINAL}) \quad (1)$$

The output capacitor discharging current during $T_2$ is $I_{LOAD\_FINAL}$. Charge $Q_2$ is defined as:

$$Q_2 = V_{DRP} * C_{out} = (I_{LOAD\_FINAL}) * T_1 \quad (2)$$

Given that the output voltage returns to the same level, Q1 and Q2 are same. Equations 1 and 2 result in a value of load current which is given by:

$$I_{LOAD\_FINAL} = I_{MAX} * \frac{T_1}{T_1 + T_2} \quad (3)$$

Where $I_{MAX}$ is directly proportional to $PG_{max}$ (maximum value of the power gates when fully turned on), 1023 for 10-bit design. The corresponding values of power gate (PG_CODE) used to produce is defined as $PG_{SOL\_DRP}$, which is the solution the computation controller calculates. In this example, $PG_{SOL\_DRP}$ is 421. $PG_{SOL\_DRP}$ is defined as:

$$PG_{SOL\_DRP} = PG_{MAX} * \frac{T_1}{T_1 + T_2} \quad (4)$$

Droop Coefficient is added to implement the adaptive correction mechanism, resulting in the form:

$$PG_{SOL\_DRP} = \alpha_{drp} * PG_{MAX} * \frac{T_1}{T_1 + T_2} \quad (5)$$

Figure 7:
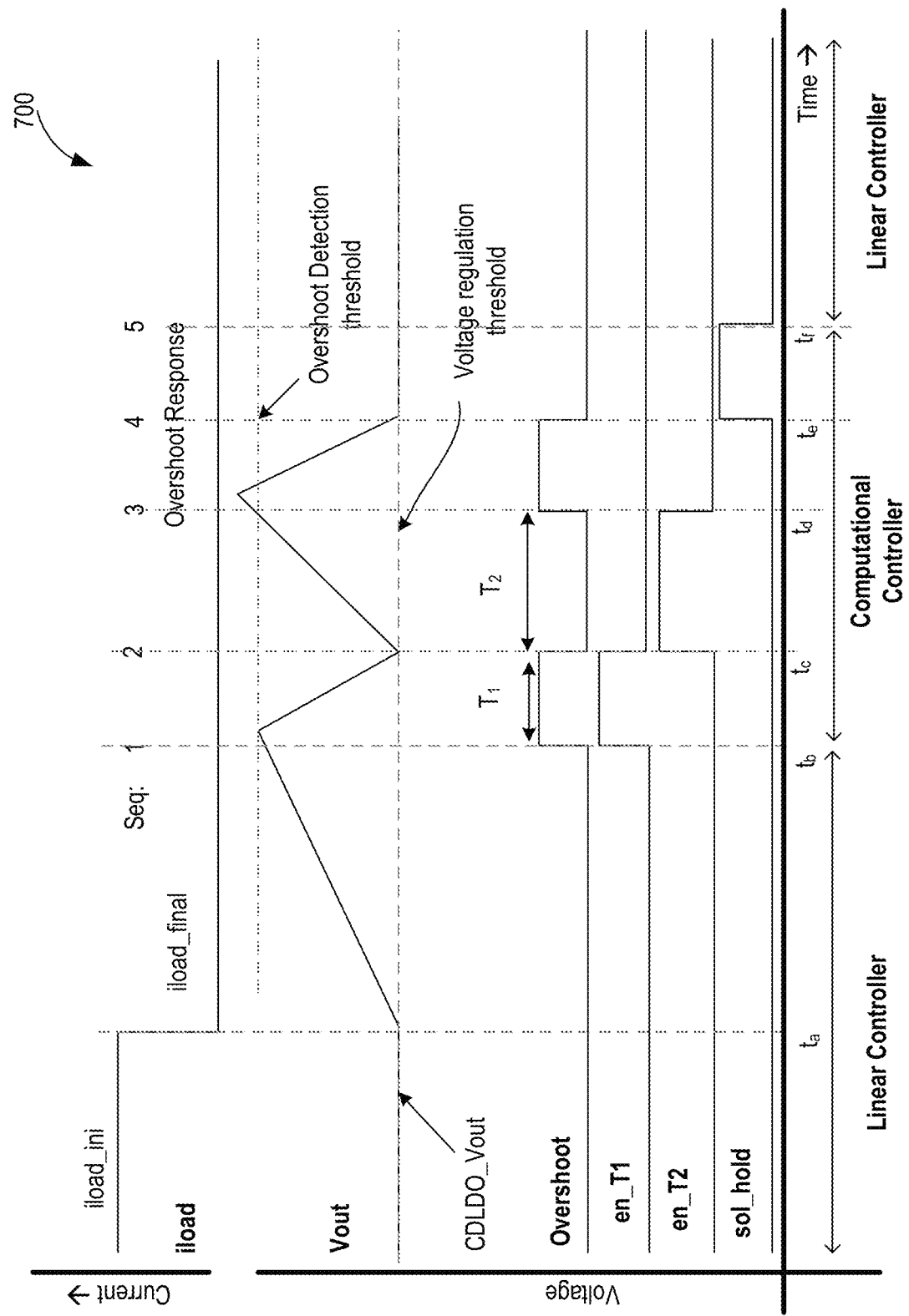
FIG. 7 illustrates a plot showing transient response of the CDLDO during an overshoot event, in accordance with some embodiments.

FIG. 7 illustrates plot 700 showing transient response of the CDLDO during an overshoot event, in accordance with some embodiments. Plot 700 shows the overshoot response of the CDLDO after a load transient. Due to the load release, the output voltage starts to go up and crosses the overshoot detection threshold at sequence (seq) 1 and the computational controller is invoked immediately after. The computational engine then drives the power gate through OFF-ON-OFF sequences (seq 1 through seq 3), measures the time duration T1, and T2, computes the solution, applies the solution at seq 4 and releases the control to the linear counter based system after handover (e.g., seq 5).

Figure 8:
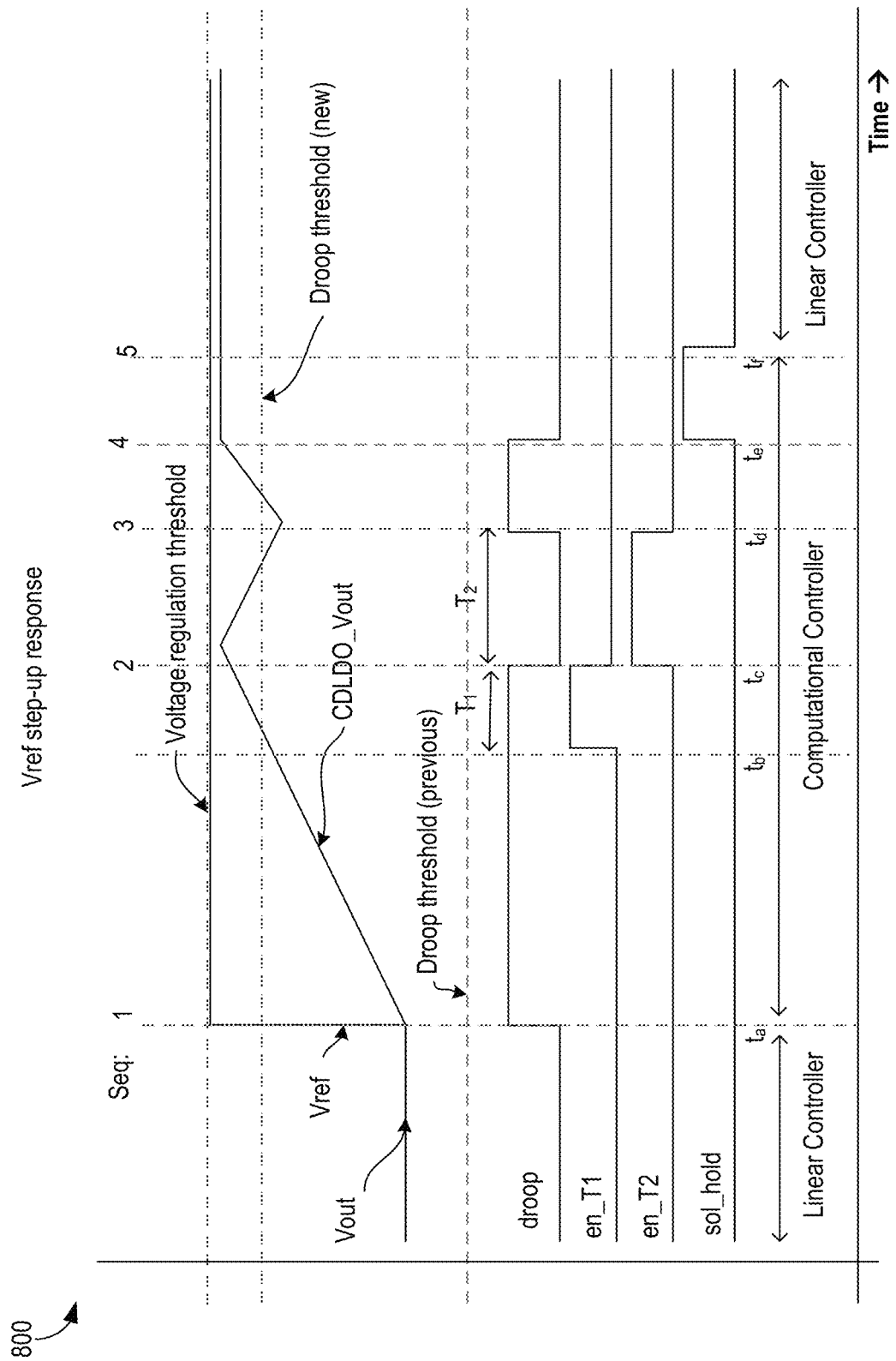
FIG. 8 illustrates a plot showing transient response of the CDLDO during a reference step-up event, in accordance with some embodiments.

FIG. 8 illustrates plot 800 showing transient response of the CDLDO during a reference step-up event, in accordance with some embodiments. During the reference step up transient, the CDLDO detects a voltage droop, similar to load transient and solves using the same equation. Plot 800 shows that the difference from load transient is that the time duration for "droop" is longer than time duration.

Figure 9:
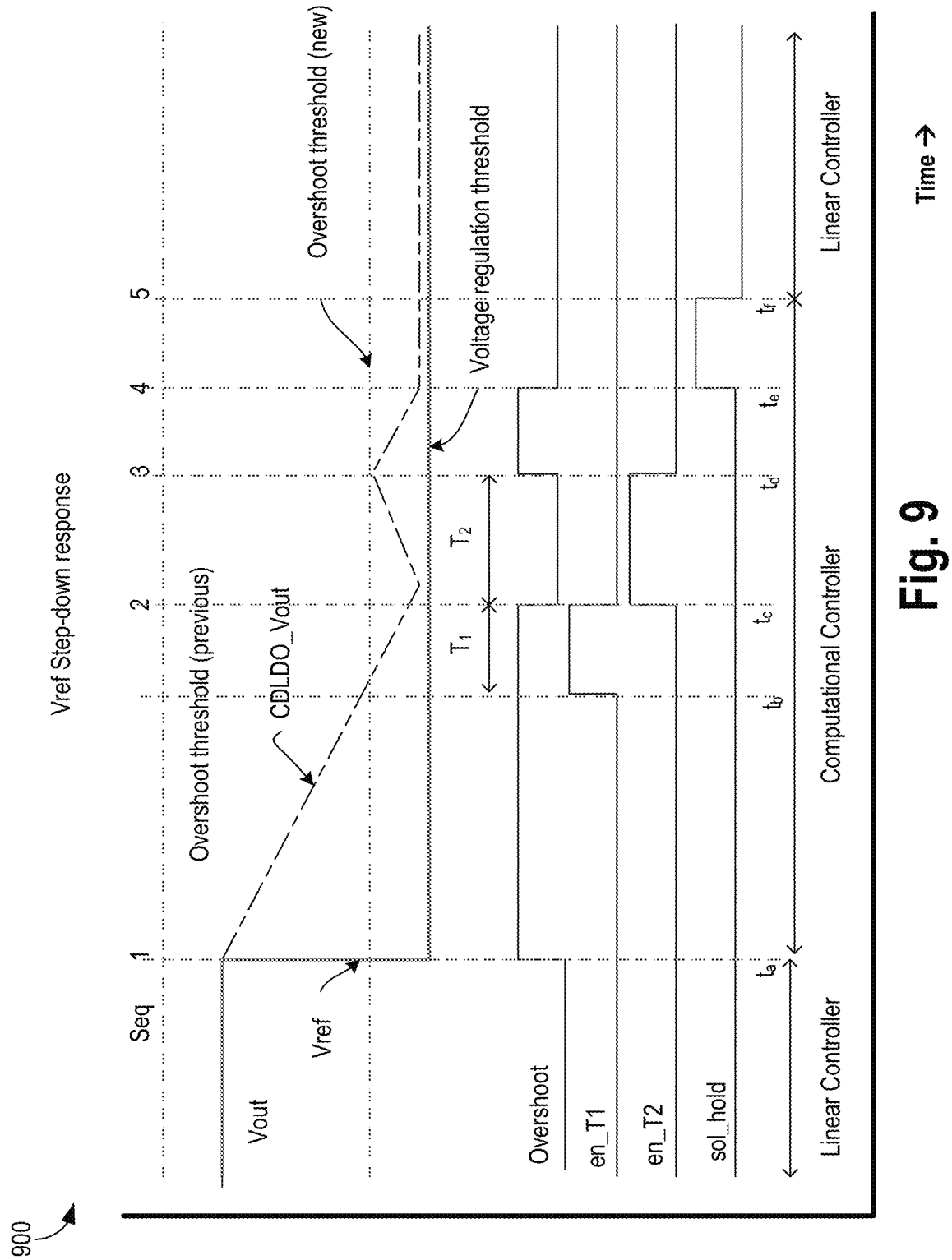
FIG. 9 illustrates a plot showing transient response of the CDLDO during a reference step-down event, in accordance with some embodiments.

FIG. 9 illustrates plot 900 showing transient response of the CDLDO during a reference step-down event, in accordance with some embodiments. During the reference step down transient, the CDLDO detects a voltage overshoot, similar to load step down and solves using the same overshoot equation. The difference from load transient is that the time duration for "overshoot" is longer than time duration T1. Plot 900 and plot 800 show that the reference transients are solved in similar manner as load transients.

Figure 10A:
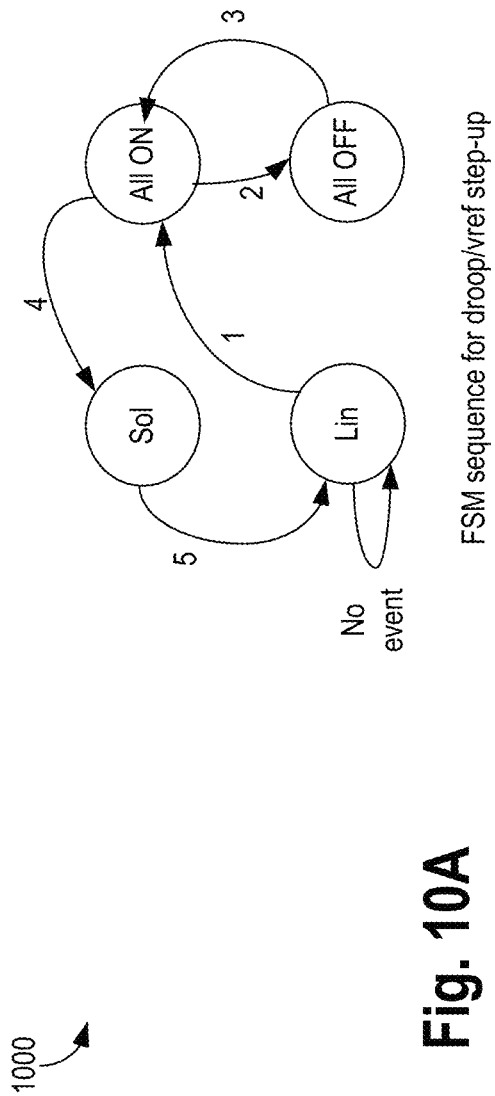
FIGS. 10A-B illustrate state diagrams of a finite state machine (FSM) of the CDLDO for mitigating droop and overshoot events, respectively, in accordance with some embodiments.
Figure 10B:
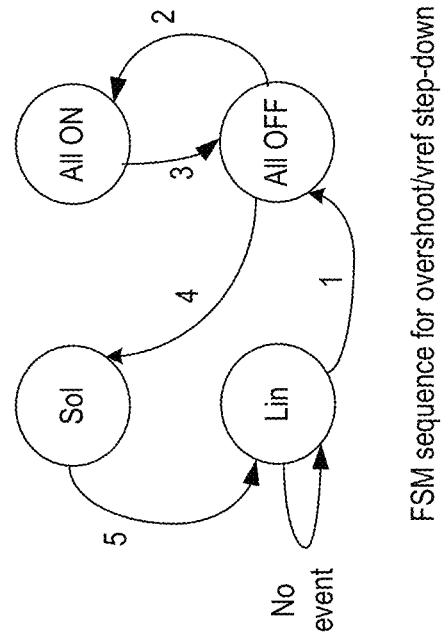

FIGS. 10A-B illustrate state diagrams 1000 and 1020, respectively, of a finite state machine (FSM) 333g of the CDLDO for droop and overshoot events, respectively, in accordance with some embodiments. FIG. 10A illustrates that when there is no event, the CDLDO operates by linear controller (LC) 301 and so FSM 333g is in the Linear (Lin) state. During a voltage droop event, or when the reference voltage suddenly steps up, FSM 333g transitions to the "All ON" state in which all power gates 305 are turned on. In the next cycle, FSM 333g transitions to the "All OFF" state in which all power gates 305 are turned off. In the next cycle, FSM 333g transitions to the "All ON" state in which all power gates are turned on. In the next cycle, it is expected that a solution will be obtained and FSM 333g transitions to the solution state "Sol". In the subsequent cycle, FSM 333g transitions back to linear controller 301.

FIG. 10B illustrates that when there is no event, the CDLDO operates by the linear controller (LC) 301 and so FSM 333g is in the Linear (Lin) state. During a voltage overshoot event, or when the reference voltage suddenly steps down, FSM 333g transitions to the "All OFF" state in which all power gates are turned off. In the next cycle, FSM 333g transitions to the "All ON" state in which all power gates are turned ON. In the next cycle, the FSM transitions to the "All OFF" state in which all power gates are turned off. In the next cycle, it is expected that a solution will be obtained and FSM 333g transitions to the solution state "Sol". In the subsequent cycle, FSM 333g transitions back to the linear controller.

Figure 11:
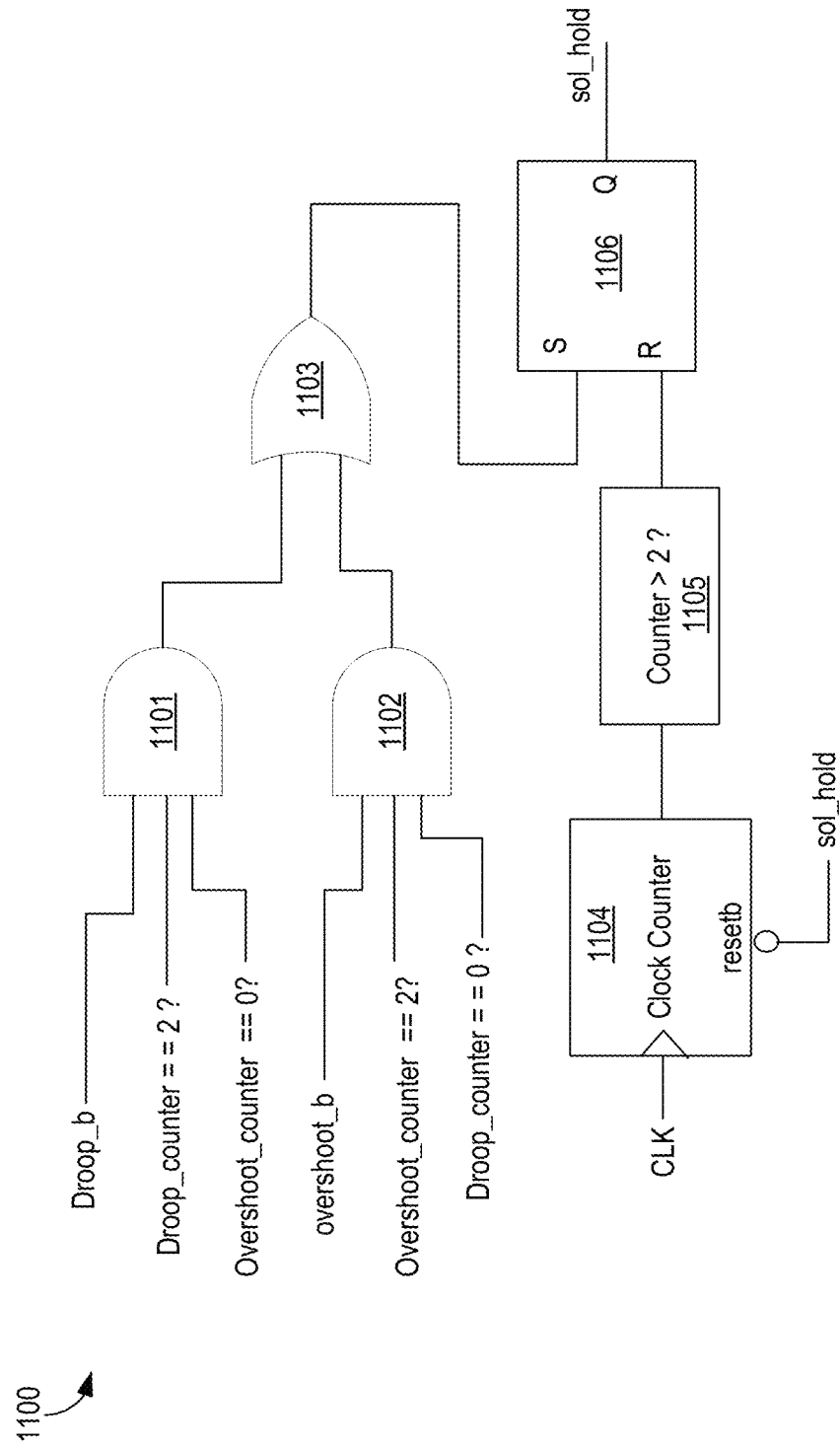
FIG. 11 illustrates a circuit for generating a handover signal for transitioning between a computational mode to a linear mode, in accordance with some embodiments.

FIG. 11 illustrates circuit 1100 for generating a handover signal for transitioning between a computational mode to a linear mode, in accordance with some embodiments. Circuit 1100 comprises AND gates 1101 and 1102, OR gate 1103, clock counter 1104 (e.g., 301a), counter 1105, and SR latch 1106 coupled as shown. A person skilled in the art would appreciate that the logic gates can be replaced with any suitable logic gates using the De-Morgan's theorem. Portions of this circuit are implemented by FSM 333g, in accordance with some embodiments.

As discussed above, a smooth handover of the PG code from the asynchronous CC 302 to the synchronous high frequency LC 301 is implemented by generating an asynchronously set, synchronously reset sol_hold signal by FSM 333g, set at the negative edge of the second event cycle, and enabling a clock pulse counter at the same time. PGs 305 are then held at the computed PG code for some clock cycles (e.g., 2 clock cycles) while it is pre-loaded into synchronous LC counter 301a, ensuring that counter 301a is fully flushed with the correct code after 2 clock pulses, thus resolving any meta-stability due to clock-crossing. Sol_hold is reset after some clock pulses (e.g., 2 clock pulses), and LC 301 starts driving PGs 305 with the PG code already pre-loaded from CC 302.

Figure 12:
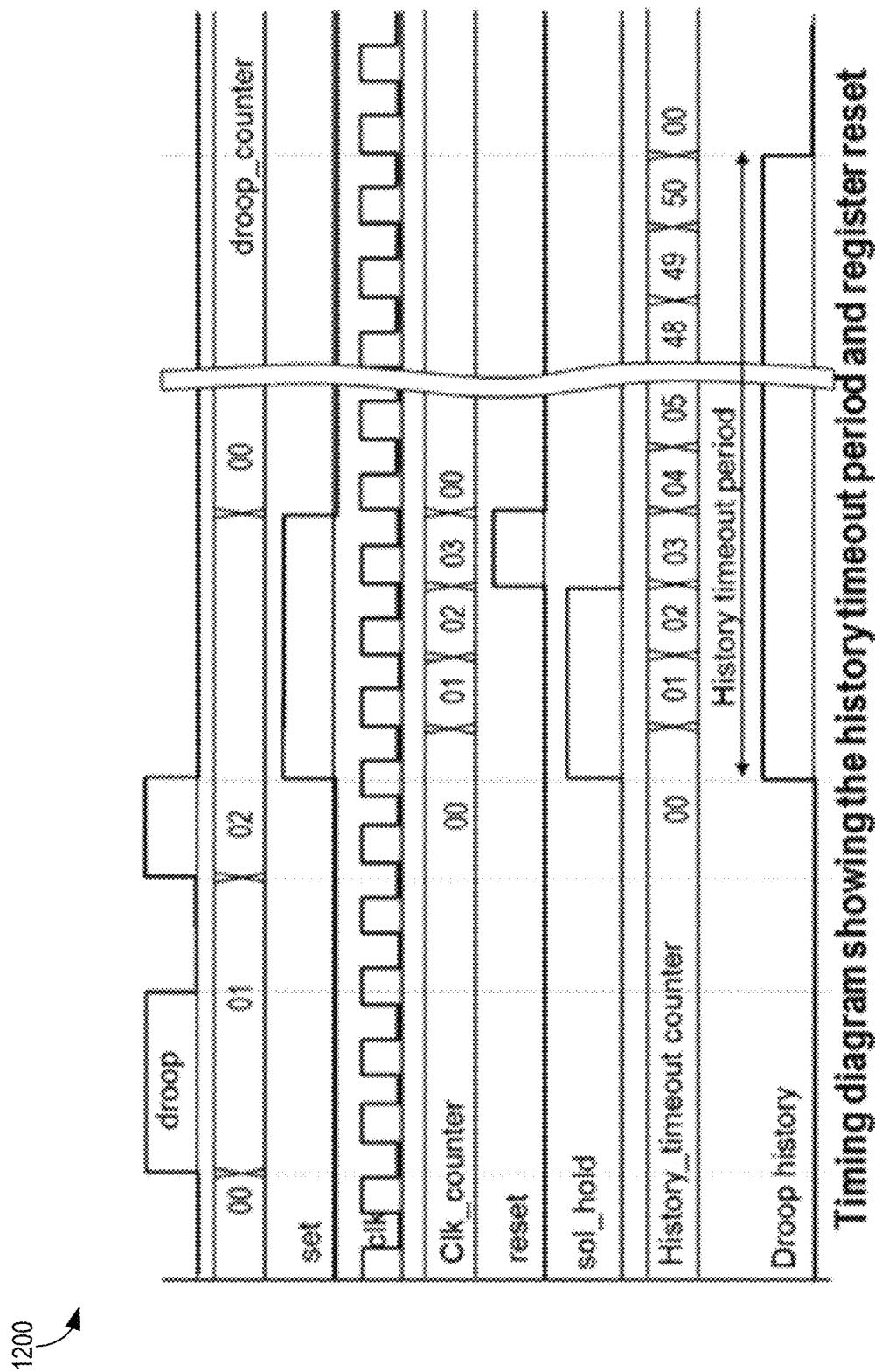
FIG. 12 illustrates a timing diagram with history timeout period and register reset, in accordance with some embodiments.

FIG. 12 illustrates timing diagram 1200 showing history timeout period and register reset, in accordance with some embodiments. The history timeout signal is used by the controller to determine if there is any error in the previous computation. The timeout signal goes away after a preprogramed number of clock cycles (in this example, 50 cycles). If the CDLDO system detects another event within the timeout signal being "high", the controller corrects the coefficient using state machine described with reference to FIG. 13A.

Figure 13A:
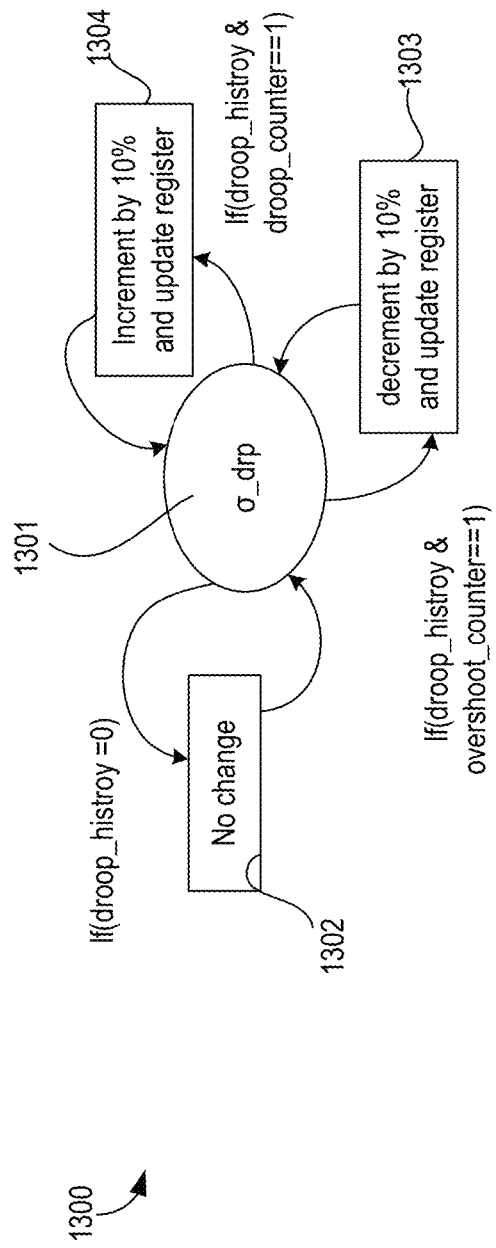
FIGS. 13A-B illustrate finite state machines for updating a droop coefficient and overshoot coefficient, respectively, in accordance with some embodiments.
Figure 13B:
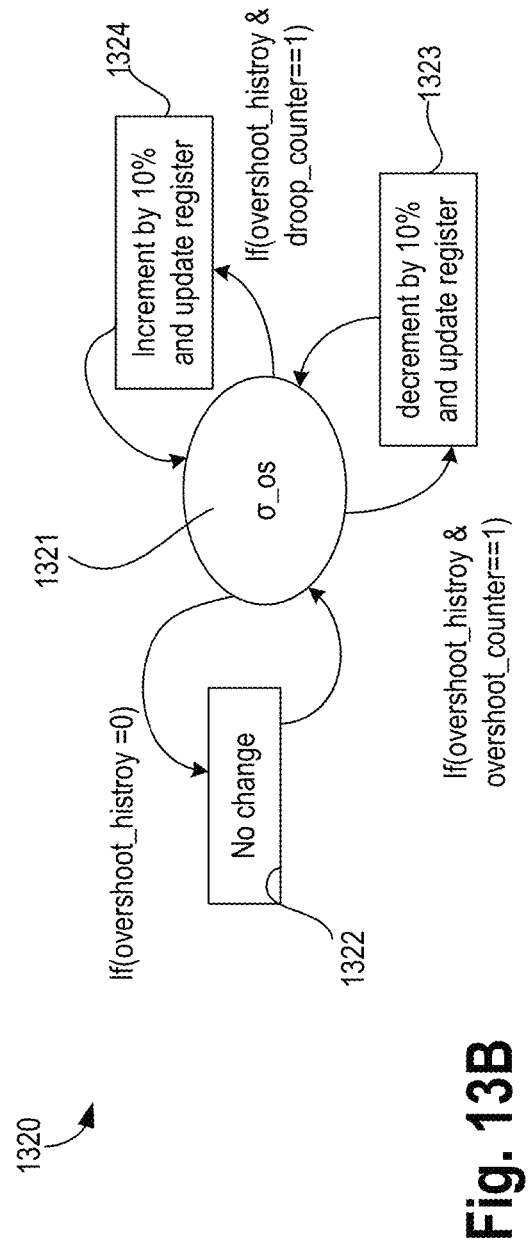

FIGS. 13A-B illustrate finite state machines (FSM) 1300 and 1320, respectively, for updating a droop coefficient and overshoot coefficient, respectively, in accordance with some embodiments. As discussed herein, the effectiveness of CC 302 across process and slow runtime variations, and for smaller dynamic ranges in low power states, is maintained by dynamically adjusting the multiplier coefficients α_drp and α_os, used for PG code computation, based on event history.

For updating the droop coefficient α_drp, FSM 1300 starts at state 1301. If there is no change in the droop history, then FSM 1300 changes its states from state 1301 to state 1302. After a predetermined or programmable clock cycle(s), FSM 1300 then changes its state from 1302 to 1301.

Given the historical data associated with droop, if the droop history (droop_history) indicates droop in the past and current value of overshoot counter 322a is 1, then FSM 1300 changes its state from state 1301 to state 1303. At state 1303, droop coefficient α_drp is decremented by 10% by counter 322a and the updated coefficient is updated in register $T_1$ reg. FSM 1300 then returns to state 1301 from state 1303.

Given the historical data associated with overshoot, if the overshoot history (overshoot_history) indicates overshoot in the past and current value of droop_counter is 1, then FSM 1300 changes its state from state 1301 to state 1304. At state 1304, overshoot α_drp is incremented by 10% and the updated coefficient is updated in the register. FSM 1300 then returns to state 1301 from state 1304.

For updating the overshoot coefficient α_drp, FSM 1320 starts at state 1321. If there is no change in the overshoot history, then FSM 1320 changes its states from state 1321 to state 1322. After a predetermined or programmable clock cycle(s), FSM 1320 then changes its state from 1322 to 1321.

Given the historical data associated with overshoot, if the overshoot history (overshoot_history) indicates overshoot in the past and current value of overshoot counter 322a is 1, then FSM 1320 changes its state from state 1321 to state 1323. At state 1323, overshoot α_drp is decremented by 10% by counter 322a and the updated coefficient is updated in register $T_2$ reg. FSM 1320 then returns to state 1321 from state 1323.

Given the historical data associated with overshoot, if the overshoot history (overshoot_history) indicates overshoot in the past and current value of droop_counter is 1, then FSM 1300 changes its state from state 1321 to state 1324. At state 1324, overshoot α_drp is incremented by 10% and the updated coefficient is updated in the register. FSM 1320 then returns to state 1321 from state 1324.

If an event recurs during a programmable timeout period, the coefficient is adjusted by 10% (or another predetermined or programmable value). The new coefficient is retained and used in subsequent events, or adjusted again on detection of another event within the timeout window. It can also be pre-configured for reference step up/down transitions to minimize computation overheads.

Figure 14A:
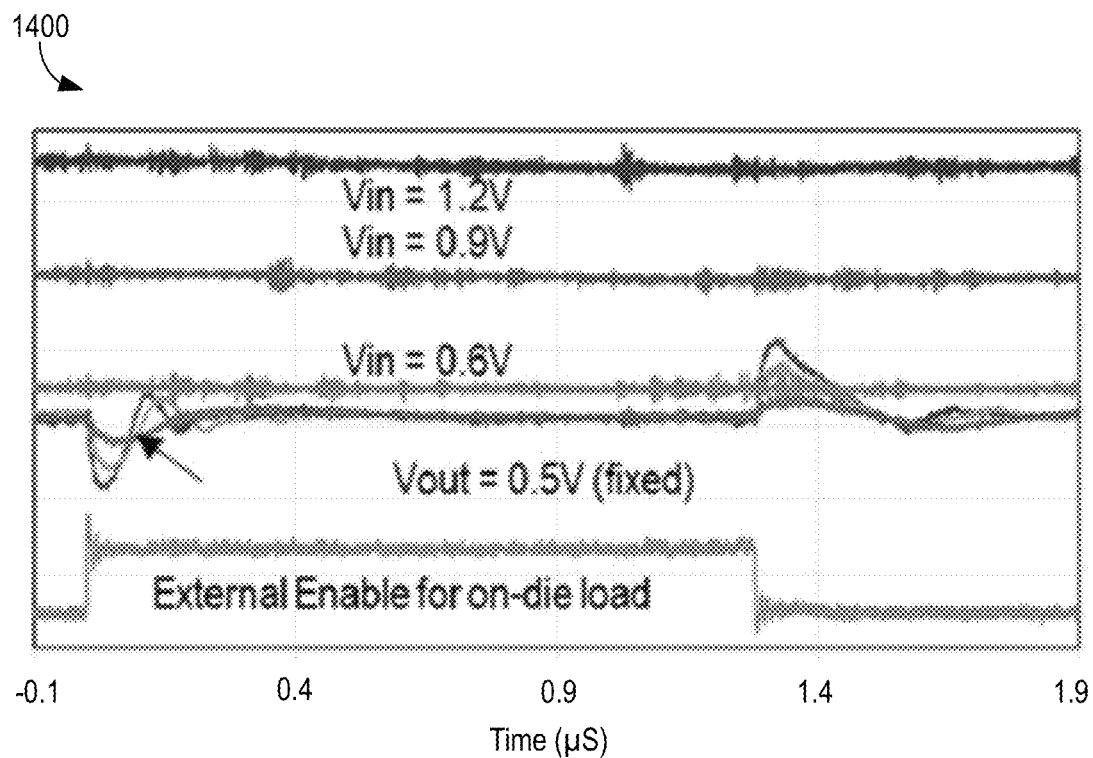
FIGS. 14A-B illustrate plots showing DLDO loop regulation characteristics for linear controller.
Figure 14B:
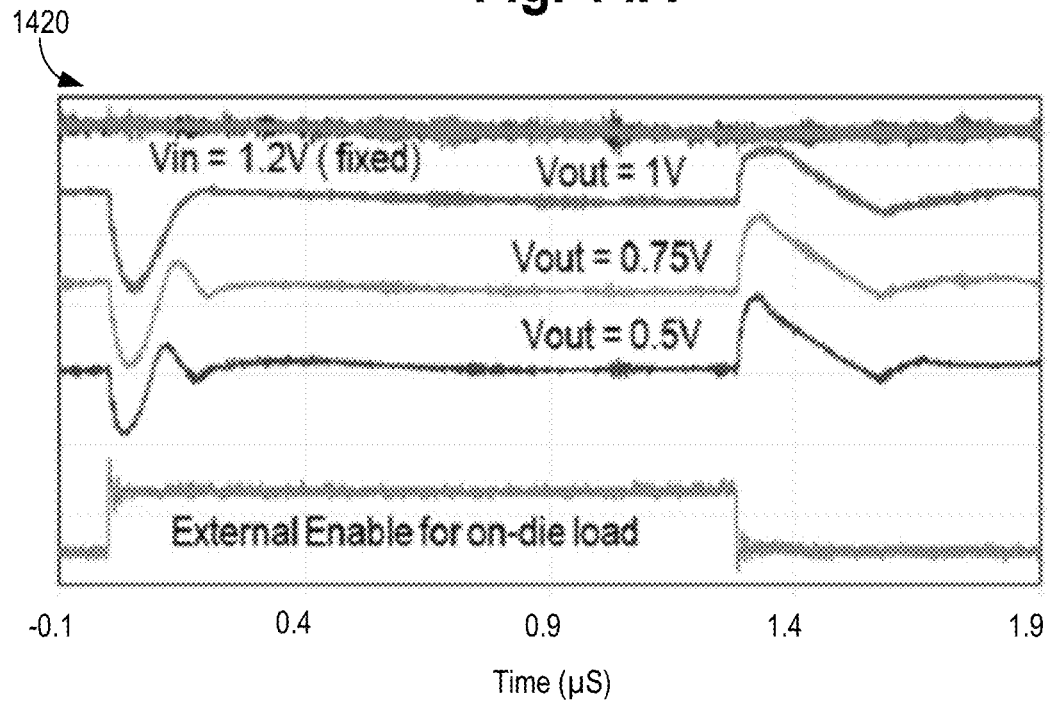

FIGS. 14A-B illustrate plots 1400 and 1420, respectively, showing DLDO loop regulation characteristics for linear controller. Response illustrated by plots 1400 and 1420 are with the computational controller turned off, and show the base line DLDO operation as achieved by a conventional controller.

Figure 15A:
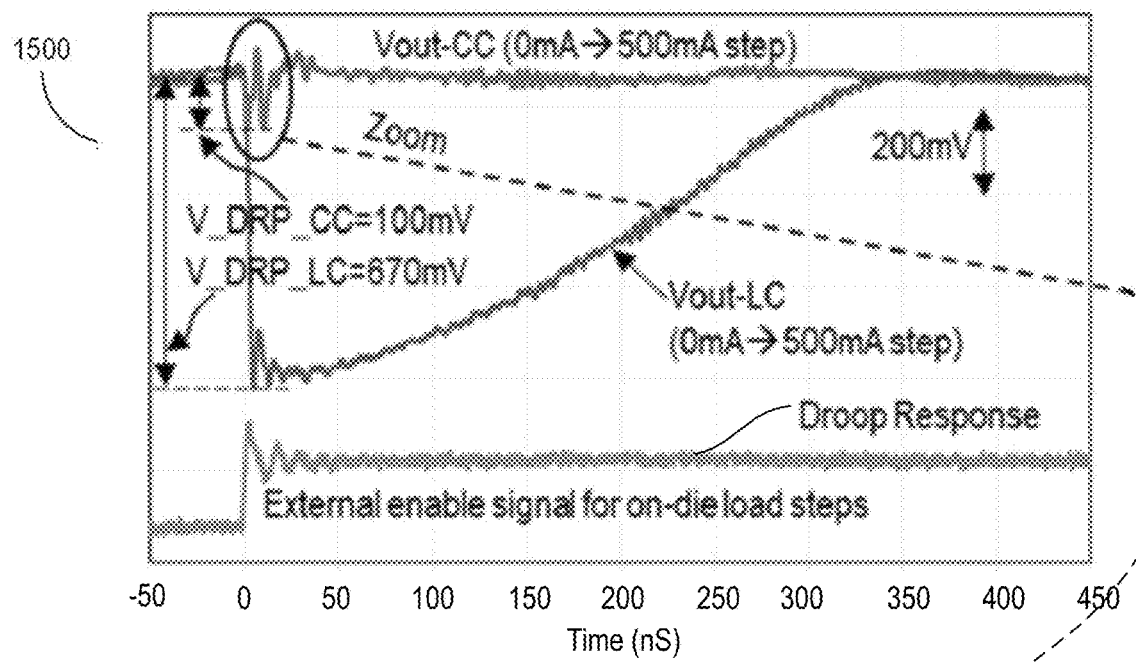
FIGS. 15A-B illustrate plots showing CDLDO loop regulation characteristics for a load step of 500 mA, in accordance with some embodiments.
Figure 15B:
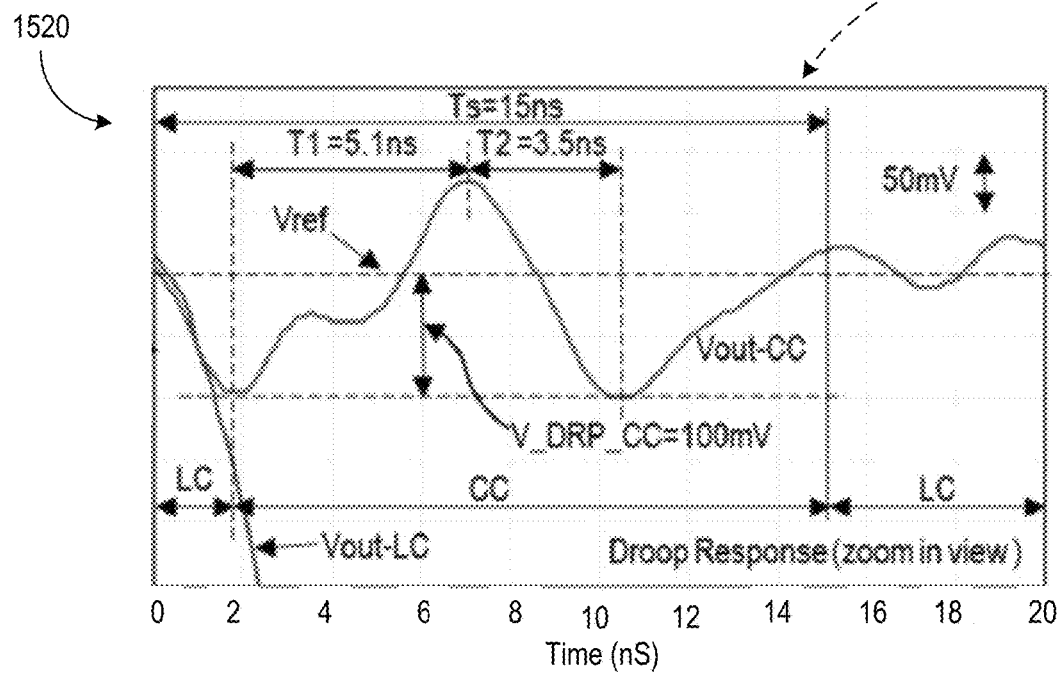

FIGS. 15A-B illustrate plots 1500 and 1520, respectively, showing CDLDO loop regulation characteristics for a load step of 500 mA, in accordance with some embodiments. Plots 1500 and 1520 show the response comparison of the computational controller (CC) against a traditional linear controller (LC). The computation controller solves the same load transient more than 22× faster and producing greater than 6× smaller droop as compared to the traditional linear controller.

Figure 16A:
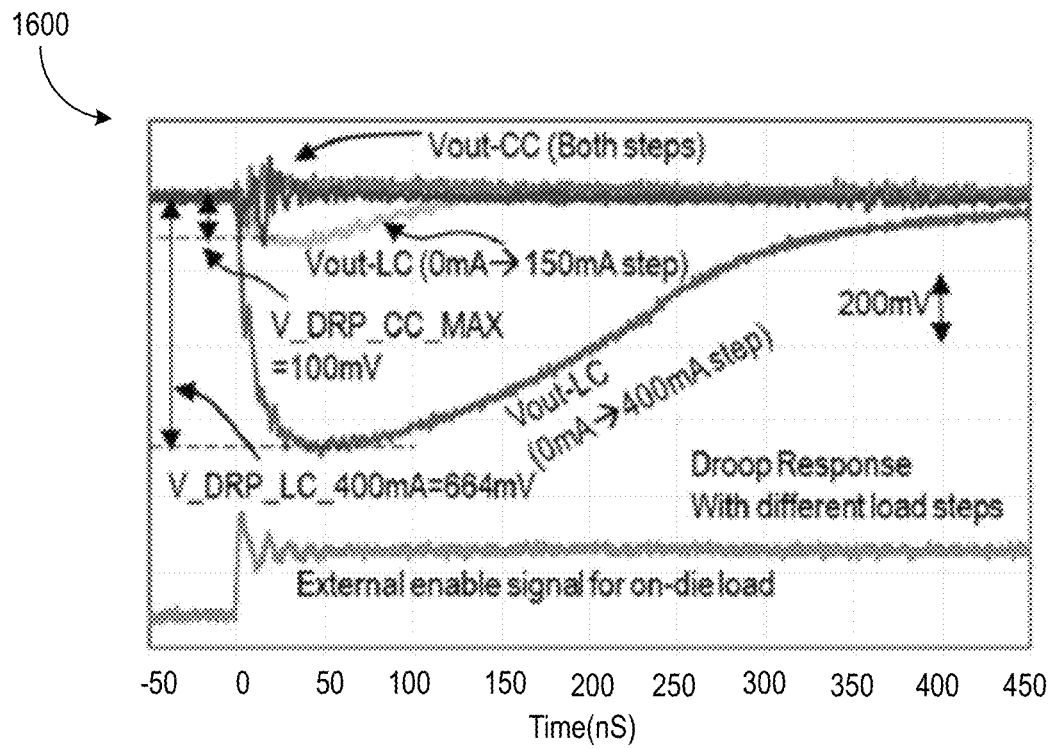
FIGS. 16A-B illustrate plots showing CDLDO loop regulation characteristics for load steps of 150 mA and 400 mA, respectively, in accordance with some embodiments.
Figure 16B:
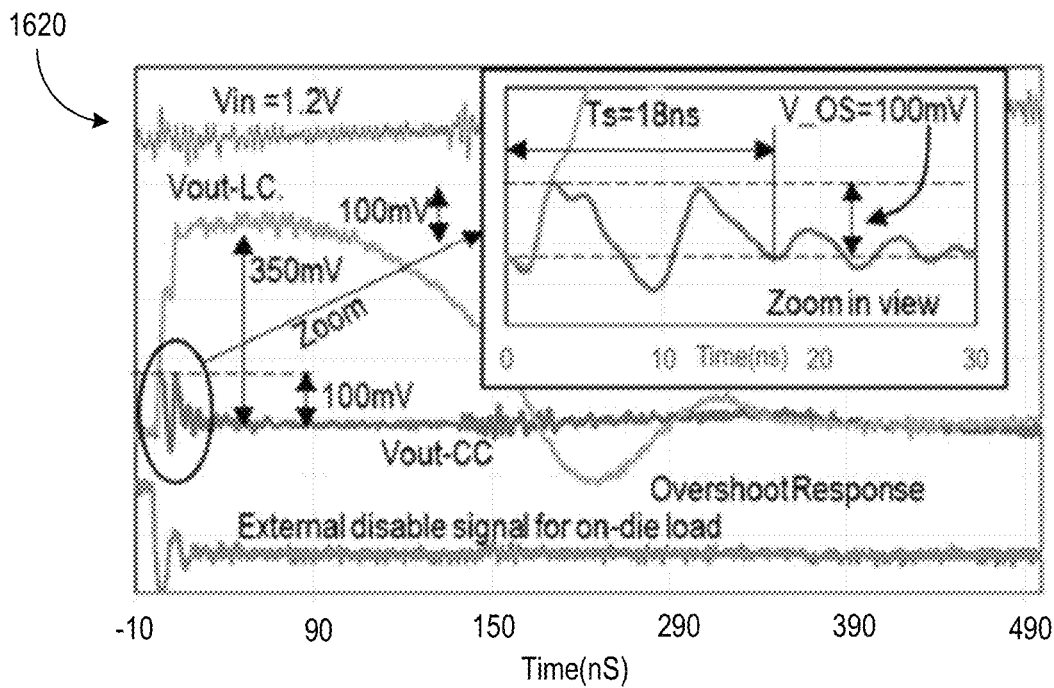
Figure 17A:
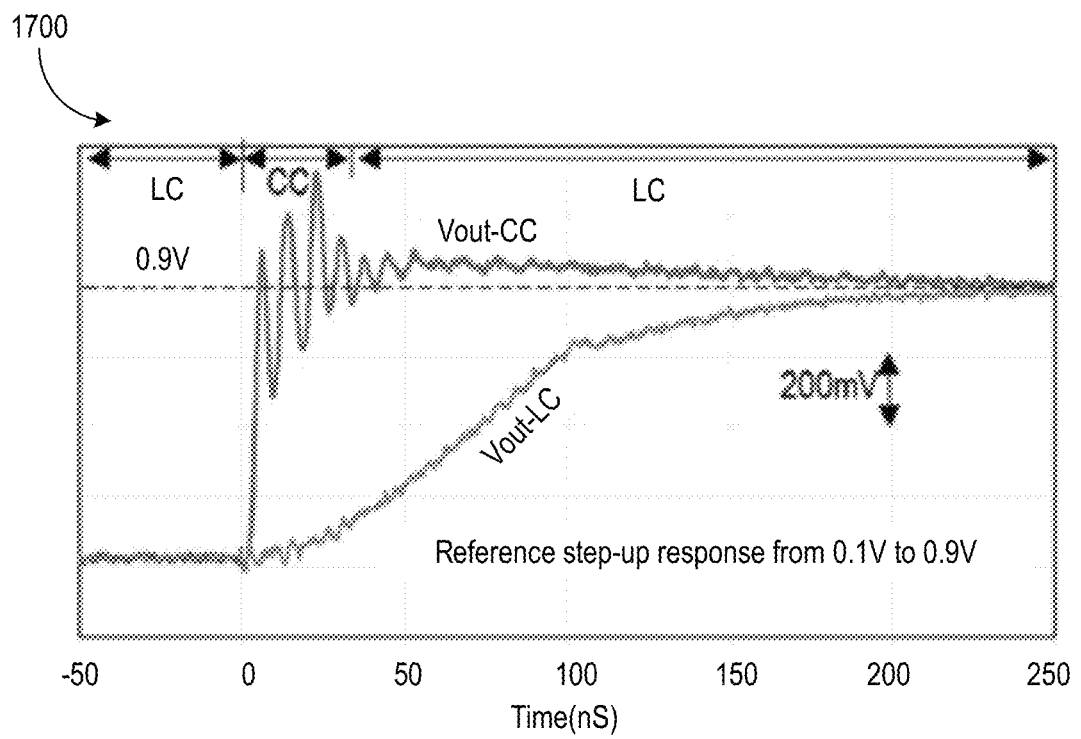
FIGS. 17A-D illustrates plots showing reference step-up and step-down transient responses along with a large step un-load event comparing the linear and computational control modes of the CDLDO, in accordance with some embodiments.
Figure 17B:
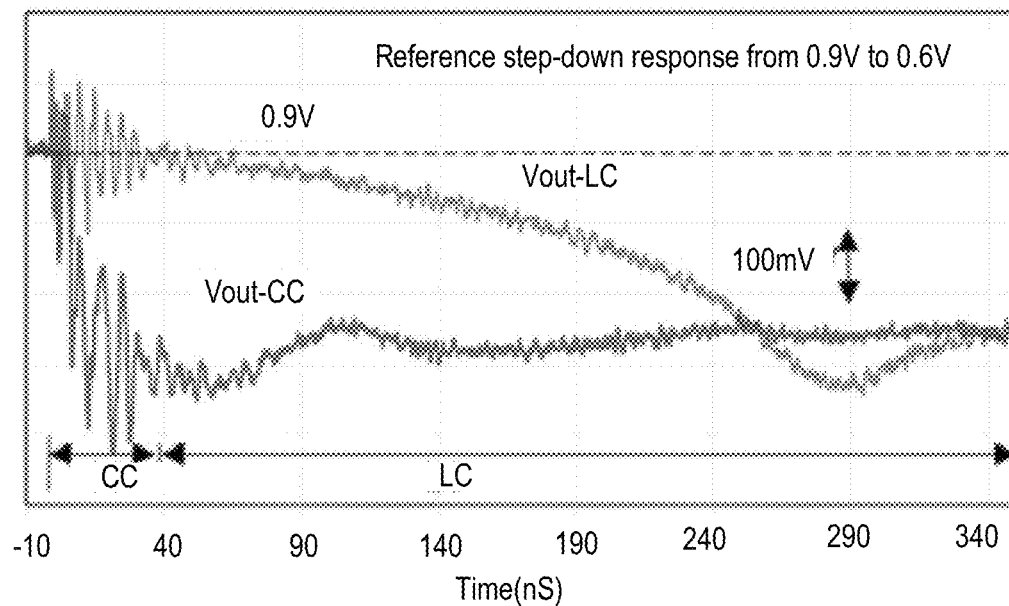
Figure 17C:
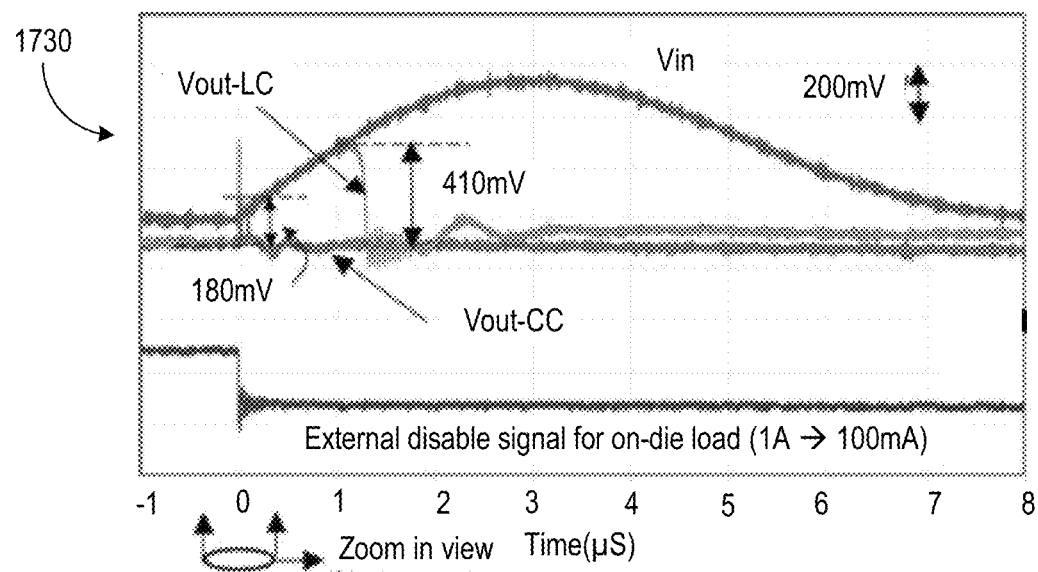
Figure 17D:
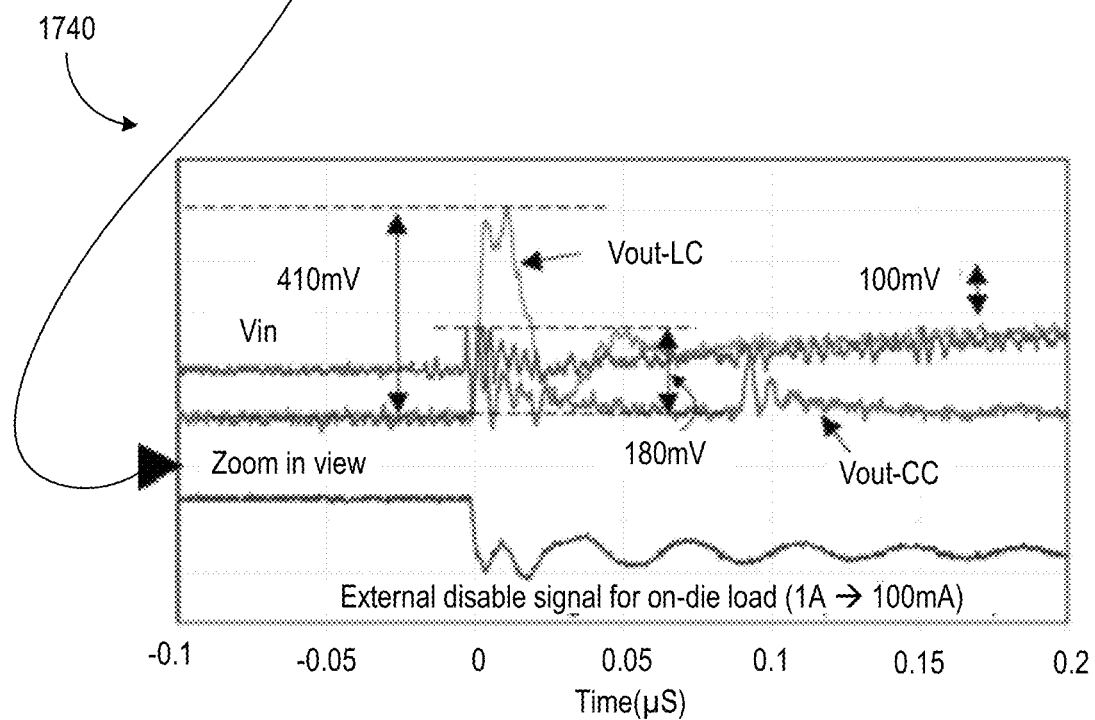

FIGS. 16A-B illustrate plots 1600 and 1620, respectively, showing CDLDO loop regulation characteristics for load steps of 150 mA and 400 mA, respectively, in accordance with some embodiments. FIG. 16A shows that the CC solves the different load transient events with the same settling time and same droop magnitude while a traditional linear controller produces varying settling times and droop values of different magnitudes. FIG. 16B shows the response comparison of the CC and LC in an overshoot event. The CC solves the overshoot event 16 times faster and produces 3.6× smaller overshoot magnitude as compared to the LC response.

FIGS. 17A-D illustrates plots 1700, 1720, 1730, and 1740, respectively, showing reference step up and step down transient responses along with a large step un-load event comparing the linear and computational control modes of the CDLDO, in accordance with some embodiments. Plots 1700 and 1720 show reference up and down transient comparison between CC and LC response. CC settles the system faster than the LC, in both scenarios. Plots 1730 and 1740 show the overshoot response from CDLDO and that CC limits the output voltage to prevent overvoltage stress to the load.

Figure 18A:
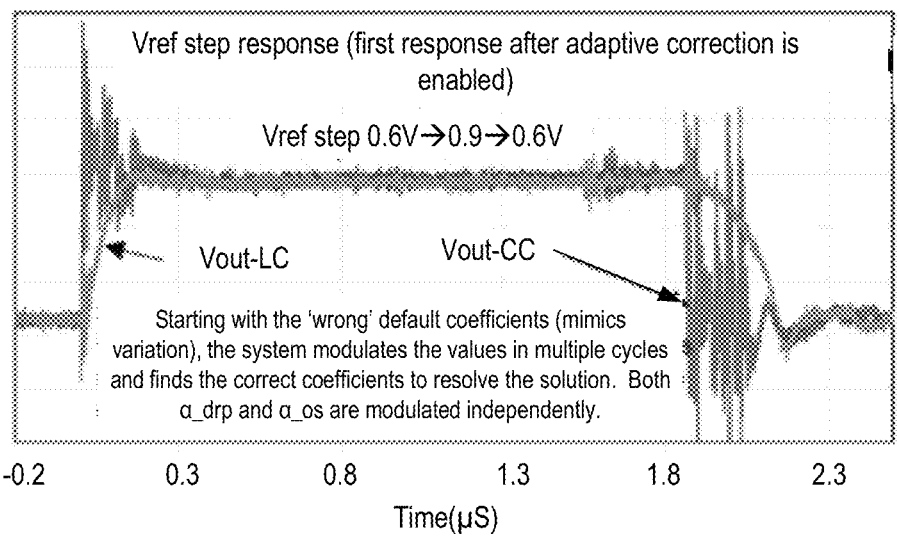
FIGS. 18A-B illustrate plots showing the effect of adaptive correction coefficients, in accordance with some embodiments.
Figure 18B:
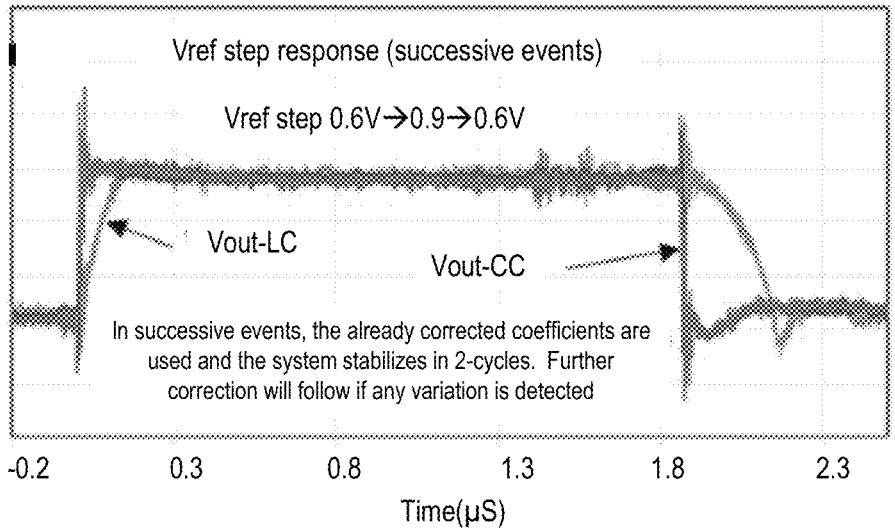

FIGS. 18A-B illustrate plots 1800 and 1820, respectively, showing the effect of adaptive correction coefficients, in accordance with some embodiments. Plots 1800 and 1820 show the automatic tuning of the droop coefficient and overshoot coefficient during the first tuning phase (plot 1800) and afterward events when the CC is using the already tuned coefficients and doesn't require further tuning.

Figure 19:
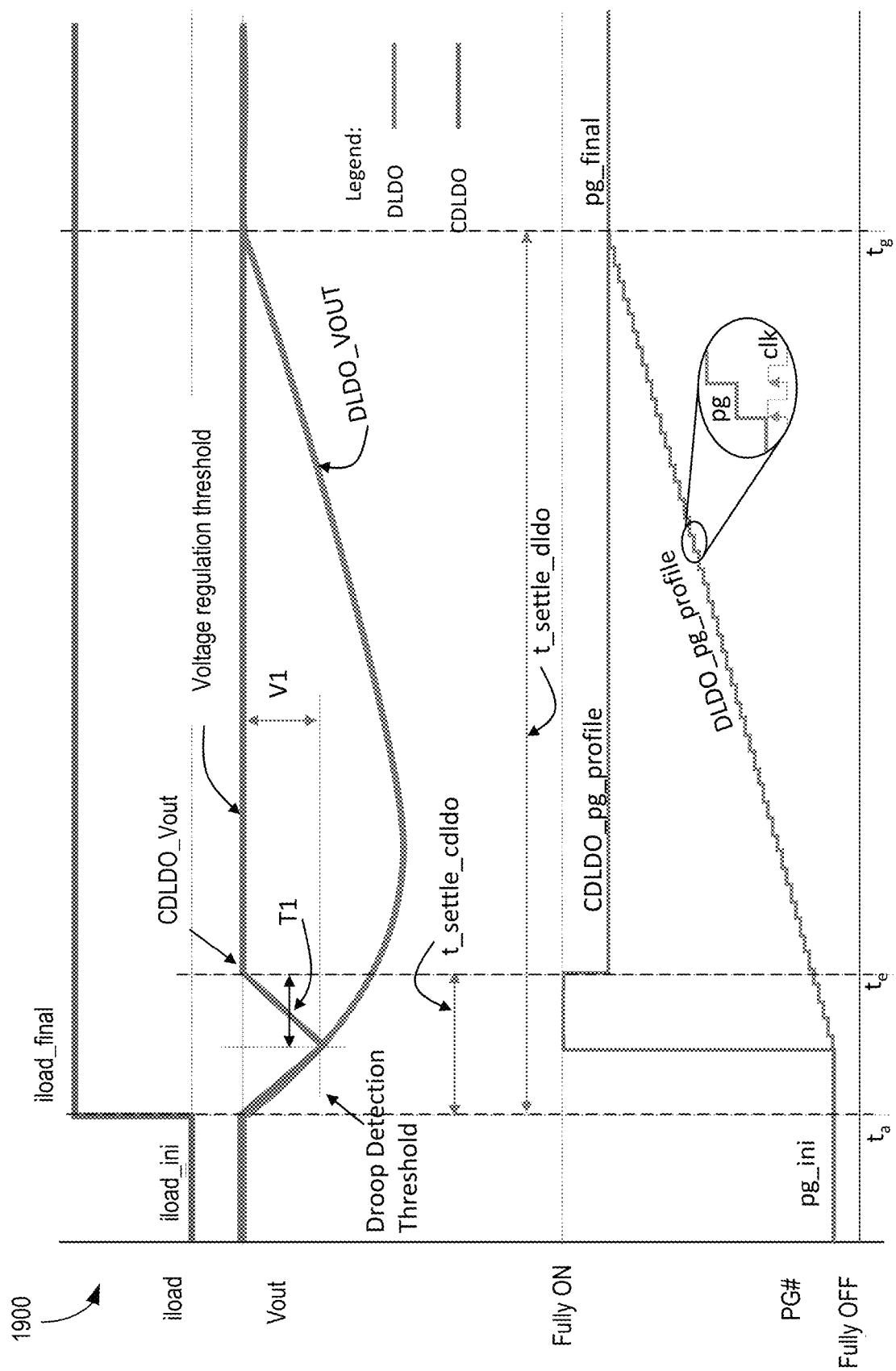
FIG. 19 illustrates a plot showing a 1-cycle settling of output voltage using CDLDO, in accordance with some embodiments.

FIG. 19 illustrates a plot 1900 showing a 1-cycle settling of output voltage using CDLDO, in accordance with some embodiments. Plot 1900 shows that conceptually, if the value of output capacitor and the value of T1 is known, the solution can be computed in one cycle instead of the two cycle described earlier.

Figure 20:
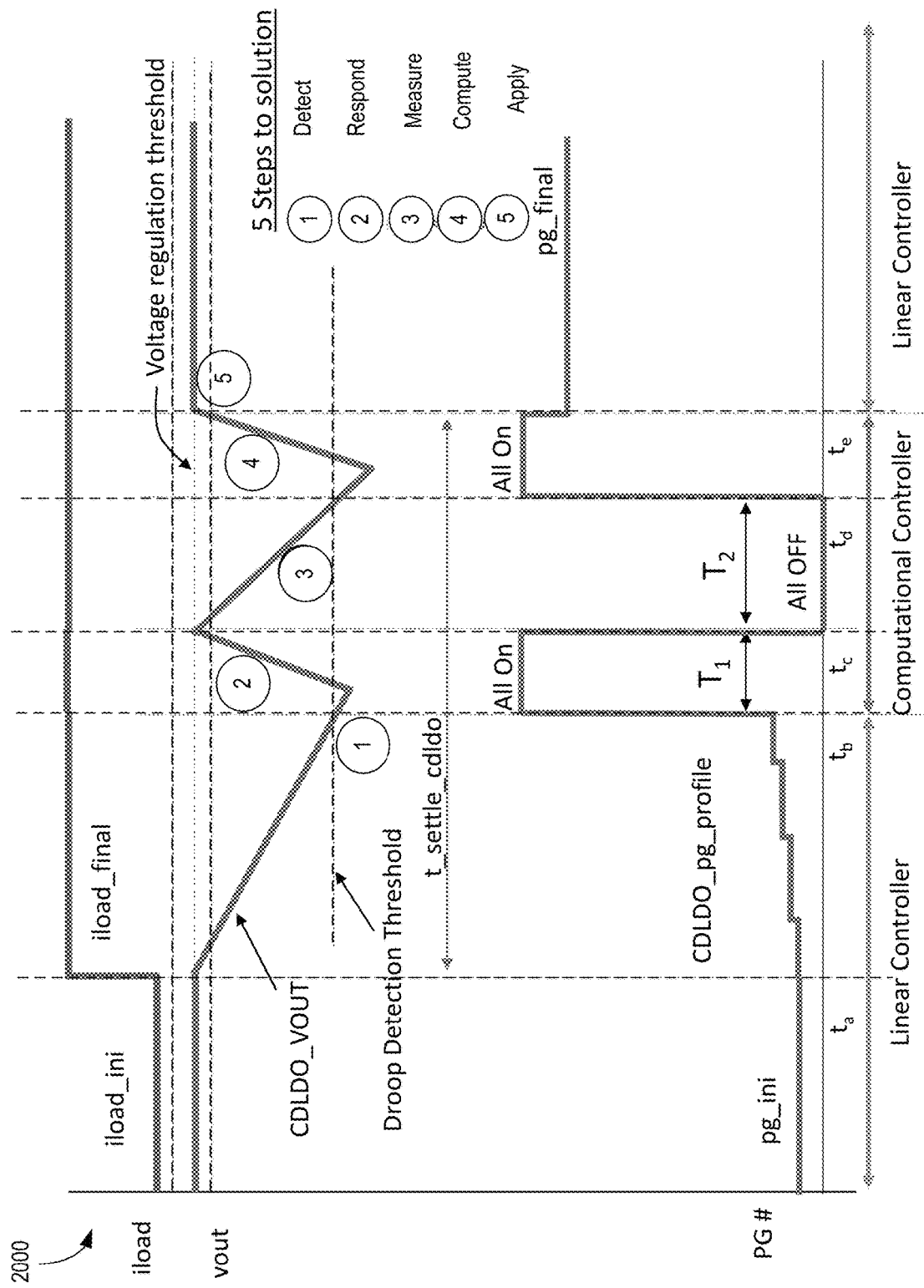
FIG. 20 illustrates a plot showing 2-cycle settling of output voltage using CDLDO, in accordance with some embodiments.

FIG. 20 illustrates plot 2000 showing 2-cycle settling of output voltage using CDLDO, in accordance with some embodiments. Plot 2000 shows the same functionality as FIG. 6 when the CDLDO system solves in two event cycles. Here, the power gate values are shown in analog scale to elaborate the concept.

Figure 21:
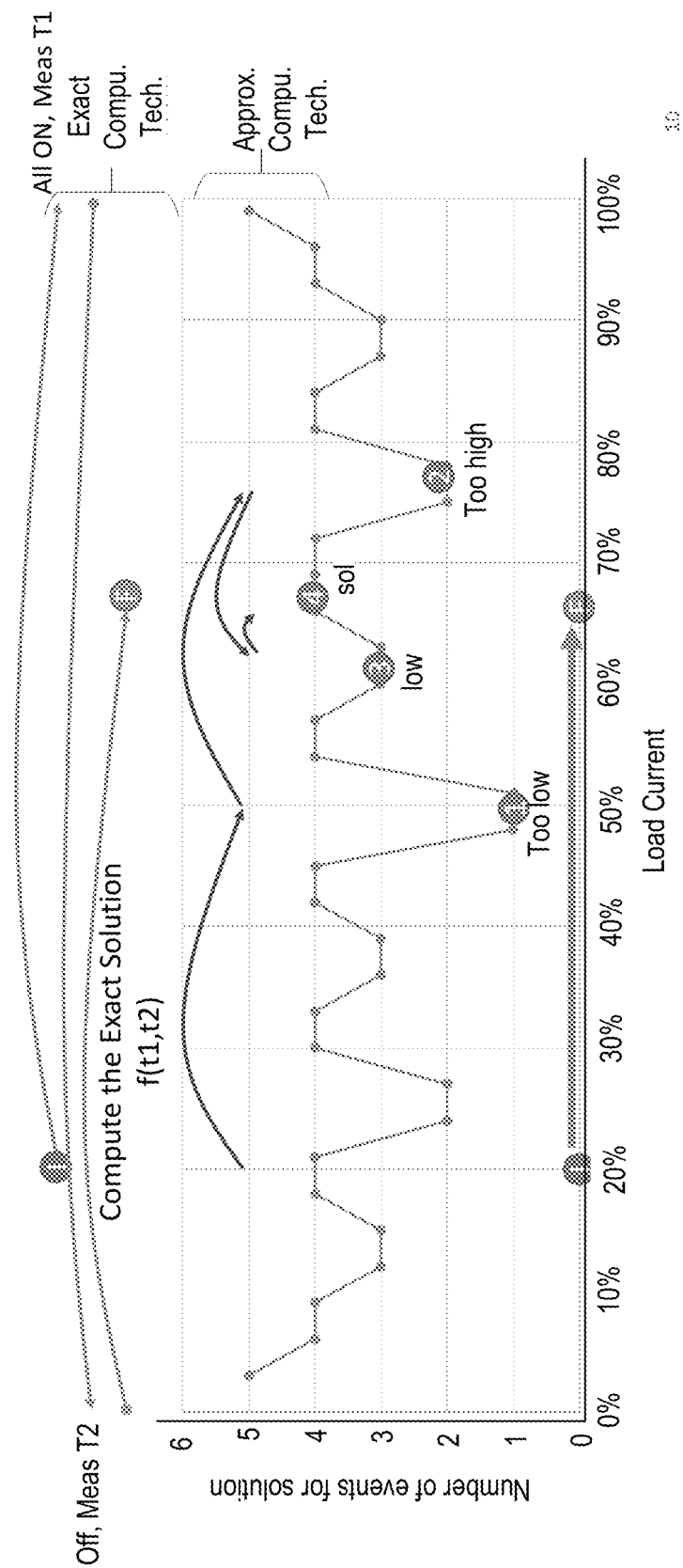
FIG. 21 illustrates a plot showing process of finding a solution for a number of active power gates to achieve fast settling of output voltage using CDLDO, in accordance with some embodiments.

FIG. 21 illustrates plot 2100 showing process of finding a solution for a number of active power gates to achieve fast settling of output voltage using CDLDO, in accordance with some embodiments. Plot 2100 shows the number of steps used to find a solution if approximation based computation is used.

Figure 22A:
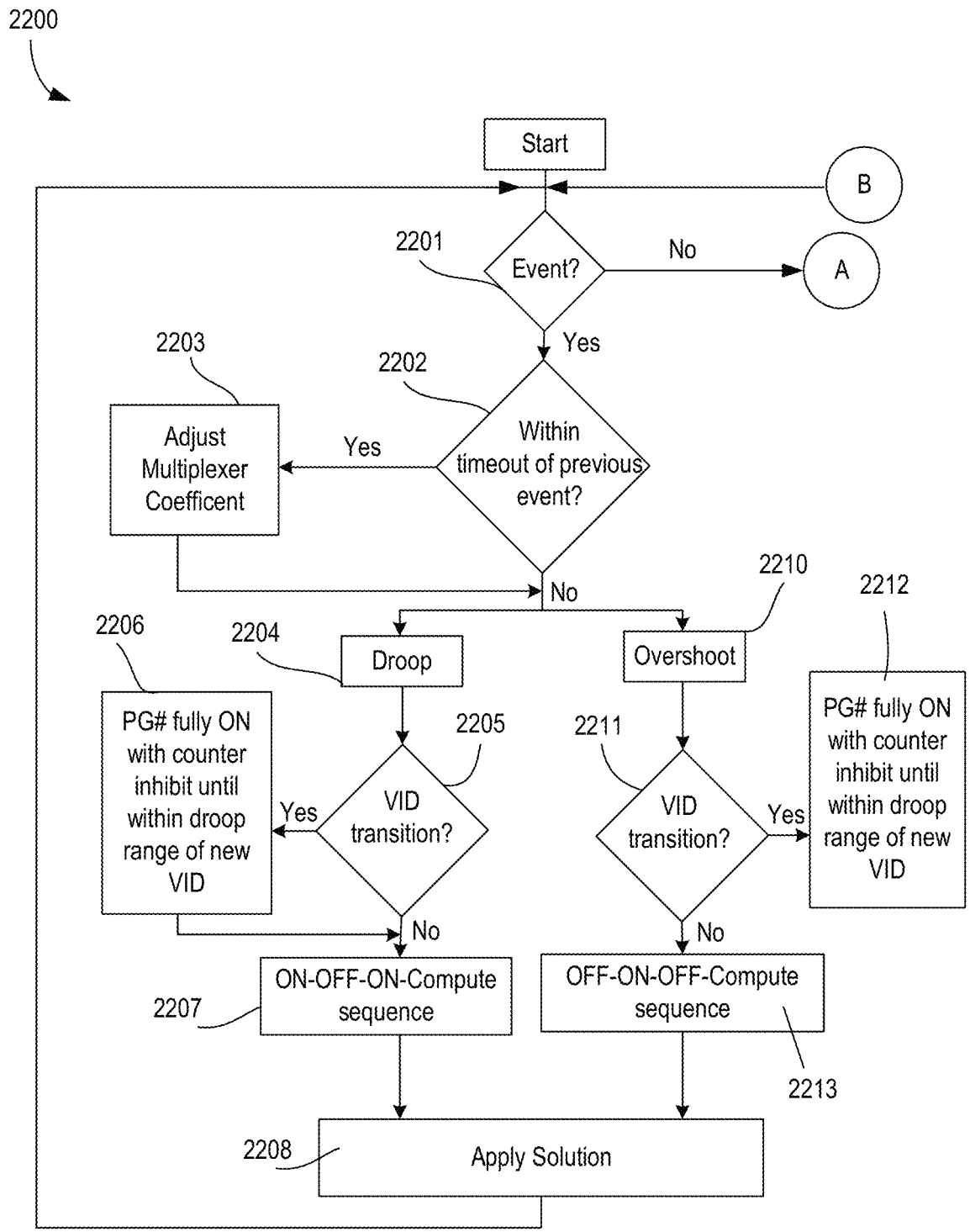
FIGS. 22A-B illustrate an operational flowchart of the CDLDO controller scheme, in accordance with some embodiments.
Figure 22B:
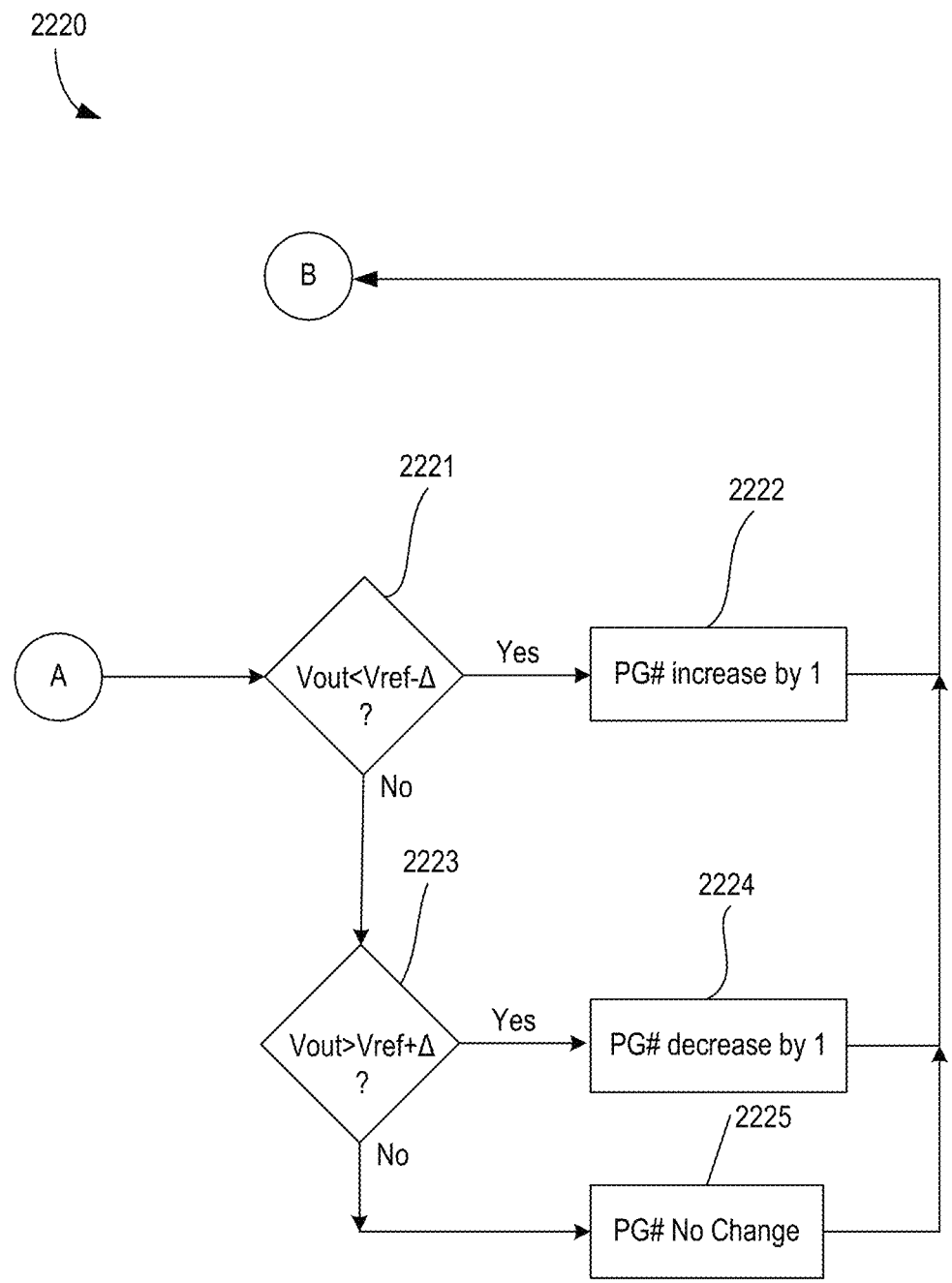

FIG. 22A-B illustrates flowchart 2200 and 2220, respectively, of the CDLDO controller scheme, in accordance with some embodiments. The flowcharts use the computational transient management circuit (CTMC) 302 along with a traditional DLDO controller 301. Traditional DLDO controller 301 comprises an up/down/steady counter which is enabled when no event is detected. The operation of controller 301 is illustrated by FIG. 22B. The operation of controller 302 is illustrated by FIG. 22A.

Once an event is detected at block 2201, CTMC 302 determines at block 2202 whether there is recent history of another event which allows the system to recalibrate itself. If not, the system either takes the droop path 2204 or overshoot path 2210 based on the type of event it has detected. Otherwise, if there is not recent history, the multiplexer coefficient is adjusted at block 2203 and the system either takes the droop path 2204 or overshoot path 2210 based on the type of event it has detected.

In the droop path 2204, circuit 302 further evaluates at block 2205 whether this event is arising from a reference transient or due to load transient. For a load transient event, the system enables a particular sequence (ON-OFF-ON/Compute) at block 2207 to control power gates 305 and to compute the solution. Once the solution is applied at block 2208, the system is stable and the process restarts at block 2201.

Due to the variation of operating temperature or aging or other source, if the computed solution is significantly different than the correct solution, the system will undergo another droop/overshoot event shortly after the solution is applied. The short duration between two consecutive events is the indication of an incorrect solution and the algorithm adjusts the multiplier coefficient in the appropriate manner so that the next solution will be correct. The overshoot event management (e.g., blocks 2210, 2211, and 2213) differs from droop event (e.g., blocks 2204, 2205, 2207) in the sequencing, it follows OFF-ON-OFF/Compute sequence of block 2213 and applies the solution at block 2208.

For a reference up transient or during startup, the system follows the same sequence as either droop management 2204 except that since the reference transient moves the reference as well as the droop window to a new level, the system inhibits the counter necessary for computation until it reaches the new droop range as indicated by block 2206. Once it is within the new droop range, it follows the same sequence as droop management. For reference down transient, it follows the overshoot management sequence after inhibiting the counter until it reaches the new overshoot range as indicated by block 2212.

If there is no event at block 2201, traditional LC 301 is used and the process proceeds to block 2221. At block 2221, a determination is made about the voltage level of Vout relative to a reference voltage Vref. If Vout is less than Vref, the process proceeds to block 2222 and counter 301a increments the number of active PGs by 1. If Vout is less than Vref, the process proceeds to block 2223. At block 2223, a determination is made regarding Vout being greater than Vref. If that is the case, counter 301a decrements the number of active PGs by 1 as indicated by block 2224. Otherwise PG code remains unchanged and the number of active and inactive power gates remains the same as indicated by block 2225. The process then restarts at block 2201.

Figure 23:
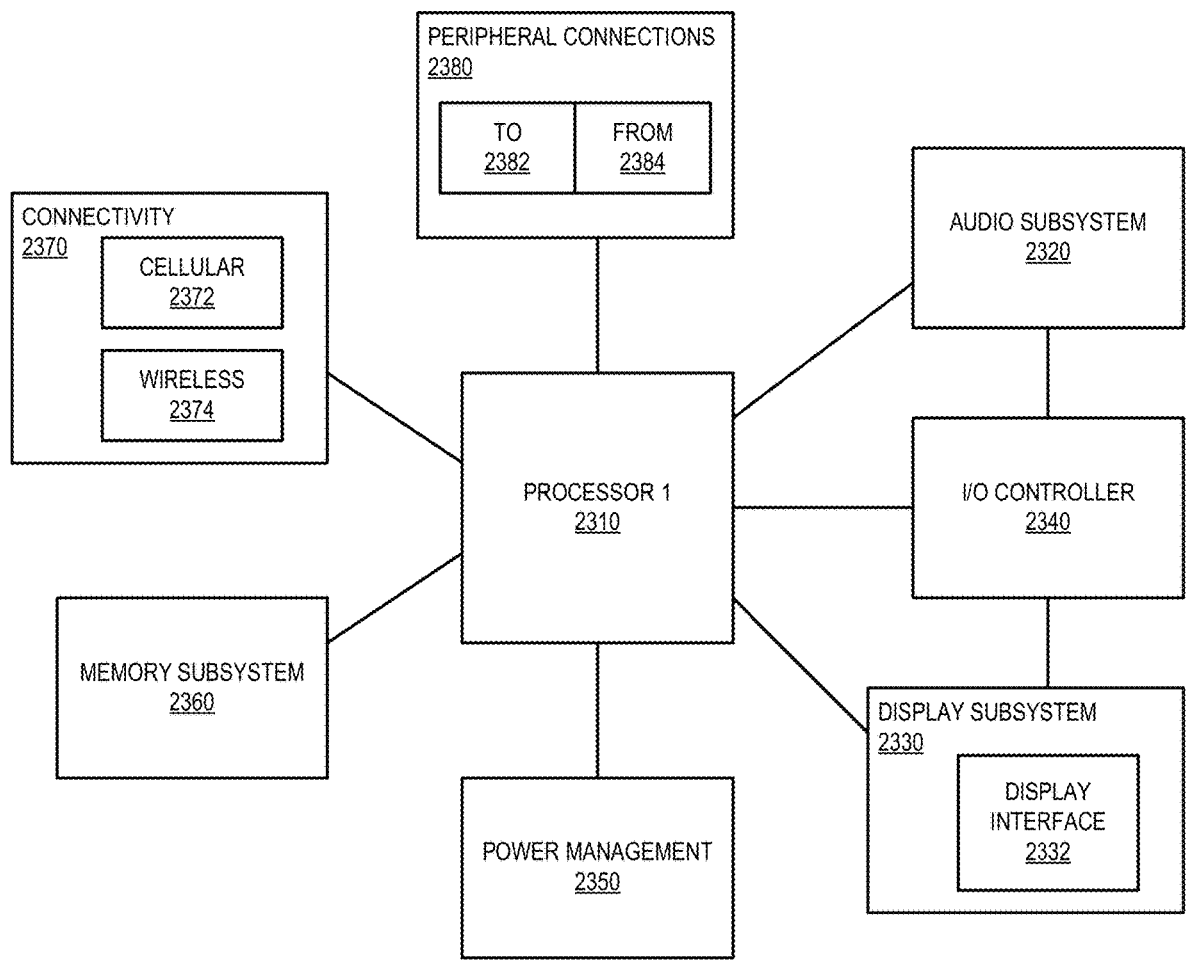
FIG. 23 illustrates a smart device or a computer system or a SoC (System-on-Chip) with CDLDO regulator, according to some embodiments.

FIG. 23 illustrates a smart device 2300 or a computer system or a SoC (System-on-Chip) with CDLDO regulator, according to some embodiments. FIG. 23 illustrates a block diagram of an embodiment of a mobile device in which flat surface interface connectors could be used. In some embodiments, computing device 2300 represents a mobile computing device, such as a computing tablet, a mobile phone or smart-phone, a wireless-enabled e-reader, or other wireless mobile device. It will be understood that certain components are shown generally, and not all components of such a device are shown in computing device 2300.

In some embodiments, computing device 2300 includes first processor 2310 with CDLDO regulator, according to some embodiments discussed. Other blocks of the computing device 2300 may also include the CDLDO regulator, according to some embodiments. The various embodiments of the present disclosure may also comprise a network interface within 2370 such as a wireless interface so that a system embodiment may be incorporated into a wireless device, for example, cell phone or personal digital assistant.

In some embodiments, processor 2310 can include one or more physical devices, such as microprocessors, application processors, microcontrollers, programmable logic devices, or other processing means. The processing operations performed by processor 2310 include the execution of an operating platform or operating system on which applications and/or device functions are executed. The processing operations include operations related to I/O (input/output) with a human user or with other devices, operations related to power management, and/or operations related to connecting the computing device 2300 to another device. The processing operations may also include operations related to audio I/O and/or display I/O.

In some embodiments, computing device 2300 includes audio subsystem 2320, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2300, or connected to the computing device 2300. In one embodiment, a user interacts with the computing device 2300 by providing audio commands that are received and processed by processor 2310.

In some embodiments, computing device 2300 comprises display subsystem 2330. Display subsystem 2330 represents hardware (e.g., display devices) and software (e.g., drivers) components that provide a visual and/or tactile display for a user to interact with the computing device 2300. Display subsystem 2330 includes display interface 2332, which includes the particular screen or hardware device used to provide a display to a user. In one embodiment, display interface 2332 includes logic separate from processor 2310 to perform at least some processing related to the display. In one embodiment, display subsystem 2330 includes a touch screen (or touch pad) device that provides both output and input to a user.

In some embodiments, computing device 2300 comprises I/O controller 2340. I/O controller 2340 represents hardware devices and software components related to interaction with a user. I/O controller 2340 is operable to manage hardware that is part of audio subsystem 2320 and/or display subsystem 2330. Additionally, I/O controller 2340 illustrates a connection point for additional devices that connect to computing device 2300 through which a user might interact with the system. For example, devices that can be attached to the computing device 2300 might include microphone devices, speaker or stereo systems, video systems or other display devices, keyboard or keypad devices, or other I/O devices for use with specific applications such as card readers or other devices.

As mentioned above, I/O controller 2340 can interact with audio subsystem 2320 and/or display subsystem 2330. For example, input through a microphone or other audio device can provide input or commands for one or more applications or functions of the computing device 2300. Additionally, audio output can be provided instead of, or in addition to display output. In another example, if display subsystem 2330 includes a touch screen, the display device also acts as an input device, which can be at least partially managed by I/O controller 2340. There can also be additional buttons or switches on the computing device 2300 to provide I/O functions managed by I/O controller 2340.

In some embodiments, I/O controller 2340 manages devices such as accelerometers, cameras, light sensors or other environmental sensors, or other hardware that can be included in the computing device 2300. The input can be part of direct user interaction, as well as providing environmental input to the system to influence its operations (such as filtering for noise, adjusting displays for brightness detection, applying a flash for a camera, or other features).

In some embodiments, computing device 2300 includes power management 2350 that manages battery power usage, charging of the battery, and features related to power saving operation. Memory subsystem 2360 includes memory devices for storing information in computing device 2300. Memory can include nonvolatile (state does not change if power to the memory device is interrupted) and/or volatile (state is indeterminate if power to the memory device is interrupted) memory devices. Memory subsystem 2360 can store application data, user data, music, photos, documents, or other data, as well as system data (whether long-term or temporary) related to the execution of the applications and functions of the computing device 2300.

Elements of embodiments are also provided as a machine-readable medium (e.g., memory 2360) for storing the computer-executable instructions (e.g., instructions to implement any other processes discussed herein). The machine-readable medium (e.g., memory 2360) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 2300 comprises connectivity 2370. Connectivity 2370 includes hardware devices (e.g., wireless and/or wired connectors and communication hardware) and software components (e.g., drivers, protocol stacks) to enable the computing device 2300 to communicate with external devices. The computing device 2300 could be separate devices, such as other computing devices, wireless access points or base stations, as well as peripherals such as headsets, printers, or other devices.

Connectivity 2370 can include multiple different types of connectivity. To generalize, the computing device 2300 is illustrated with cellular connectivity 2372 and wireless connectivity 2374. Cellular connectivity 2372 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2374 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 2300 comprises peripheral connections 2380. Peripheral connections 2380 include hardware interfaces and connectors, as well as software components (e.g., drivers, protocol stacks) to make peripheral connections. It will be understood that the computing device 2300 could both be a peripheral device ("to" 2382) to other computing devices, as well as have peripheral devices ("from" 2384) connected to it. The computing device 2300 commonly has a "docking" connector to connect to other computing devices for purposes such as managing (e.g., downloading and/or uploading, changing, synchronizing) content on computing device 2300. Additionally, a docking connector can allow computing device 2300 to connect to certain peripherals that allow the computing device 2300 to control content output, for example, to audiovisual or other systems.

In addition to a proprietary docking connector or other proprietary connection hardware, the computing device 2300 can make peripheral connections 2380 via common or standards-based connectors. Common types can include a Universal Serial Bus (USB) connector (which can include any of a number of different hardware interfaces), Display-Port including MiniDisplayPort (MDP), High Definition Multimedia Interface (HDMI), Firewire, or other types.

FIG. 24 illustrates another smart device or a computer system or a SoC (System-on-Chip) 2400 with CDLDO regulator, according to some embodiments.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 24, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 16, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 may include CDLDO regulator of various embodiments. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410a/b and/or PMIC 2412. In some embodiments, each core has a network of distributed LDOs to provide efficient control for power management. The LDOs can be digital, analog, or a combination of digital or analog LDOs.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples are provided to illustrate some embodiments. These examples can be combined in any suitable manner.

Example 1: An apparatus comprising: a plurality of power gates coupled to a first power supply rail and a second power supply rail; a multiplexer having an output to control the plurality of power gates; a first controller to generate a first output which is coupled to a first input of the multiplexer, wherein the multiplexer is to control the plurality of power gates with the first output in normal mode; and a second controller to generate a second output which is coupled to a second input of the multiplexer, wherein the multiplexer is to control the plurality of power gates with the second output in one of: overshoot event on the second power supply rail or a droop event on the second power supply rail.

Example 2: The apparatus of example 1, wherein the first controller comprises a counter, which operates at a frequency slower than a counter of the second controller.

Example 3: The apparatus of example 1 comprises an analog-to-digital converter (ADC) having an input coupled to the second power supply rail via a voltage divider, and an output coupled to the second controller.

Example 4: The apparatus of example 1, wherein the second controller comprises a comparator to compare the output of the ADC with a voltage identification code (VID).

Example 5: The apparatus of example 4, wherein an output of the comparator is used to generate select control for the multiplexer to select one of the first or second outputs.

Example 6: The apparatus of example 1, wherein in case of the droop event on the second power supply rail, the second controller is to control the multiplexer such that the multiplexer updates the output of the multiplexer in a first sequence.

Example 7: The apparatus of example 6, wherein the first sequence comprises: update the output of the multiplexer by a linear control of the one or more power gates of the plurality; update the output of the multiplexer to turn on all the plurality of power gates; update the output of the multiplexer to turn off all the plurality of power gates; update the output of the multiplexer with a computed code; and update the output of the multiplexer by linear control of the one or more power gates of the plurality via the first output.

Example 8: The apparatus of example 1, wherein in case of the overshoot event on the second power supply rail, the second controller is to control the multiplexer such that the multiplexer updates the output of the multiplexer in a second sequence.

Example 9: The apparatus of example 5, wherein the second sequence comprises: update the output of the multiplexer by a linear control of the one or more power gates of the plurality via the first output; update the output of the multiplexer to turn off all the plurality of power gates; update the output of the multiplexer to turn on all the plurality of power gates; update the output of the multiplexer with a computed code; and update the output of the multiplexer by the linear control of the one or more power gates of the plurality via the first output.

Example 10: The apparatus of example 1 comprises a load coupled to the second power supply rail.

Example 11: The apparatus of example 10, wherein the load comprises a processor core.

Example 12: An apparatus comprising: a plurality of power gates coupled to a first power supply rail and a second power supply rail; an analog-to-digital converter (ADC) coupled to the second power supply rail, the ADC to provide a digital representation of a voltage on the second power supply rail; logic to receive the digital representation of the voltage and to generate one or more controls; and a multiplexer to receive one of the one or more controls and to selectively provide a digital code to turn on or off one or more of the plurality of power gates, wherein the multiplexer is to, according to the control, generate the digital code to cause all the plurality of power gates to turn on, cause all the plurality of power gates to turn off, linearly control the plurality of power gates, or to provide a computed digital code according to an event on the second power supply rail.

Example 13: The apparatus of example 12 comprises a buffer coupled to an output of the multiplexer and the plurality of power gates.

Example 14: The apparatus of example 12, wherein when the event is a voltage droop event on the second power supply rail, wherein the logic is to control the multiplexer such that the multiplexer provides updates to the digital code in a first sequence.

Example 15: The apparatus of example 14, wherein the first sequence comprises: update the digital code by a linear control of the one or more power gates of the plurality; update the digital code to turn on all the plurality of power gates; update the digital code to turn off all the plurality of power gates; update the digital code with a computed code; and update the digital code by the linear control of the one or more power gates of the plurality.

Example 16: The apparatus of example 12, wherein when the event is a voltage overshoot event on the second power supply rail, wherein the logic is to control the multiplexer such that the multiplexer provides updates to the digital code in a second sequence.

Example 17: The apparatus of example 16, wherein the second sequence comprises: update the digital code by a linear control of the one or more power gates of the plurality; update the digital code to turn off all the plurality of power gates; update the digital code to turn on all the plurality of power gates; update the digital code with a computed code; and update the digital code by the linear control of the one or more power gates of the plurality.

Example 18: A system comprising: a memory; a processor core coupled to the memory; and a voltage regulation circuitry coupled to the processor core, wherein the voltage regulation circuitry comprises: a plurality of power gates coupled to a first power supply rail and a second power supply rail; a multiplexer having an output to control the plurality of power gates; a first controller to generate a first output which is coupled to a first input of the multiplexer, wherein the multiplexer is to control the plurality of power gates with the first output in normal mode; and a second controller to generate a second output which is coupled to a second input of the multiplexer, wherein the multiplexer is to control the plurality of power gates with the second output in one of: overshoot event on the second power supply rail or a droop event on the second power supply rail.

Example 19: The system of example 18, wherein in case of the droop event on the second power supply rail, the second controller is to control the multiplexer such that the multiplexer updates the output of the multiplexer in a first sequence.

Example 20: The system of example 19, wherein the first sequence comprises: update the output of the multiplexer by a linear control of the one or more power gates of the plurality; update the output of the multiplexer to turn on all the plurality of power gates; update the output of the multiplexer to turn off all the plurality of power gates; update the output of the multiplexer with a computed code; and update the output of the multiplexer by linear control of the one or more power gates of the plurality via the first output.

Example 21: The system of example 18, wherein in case of the overshoot event on the second power supply rail, the second controller is to control the multiplexer such that the multiplexer updates the output of the multiplexer in a second sequence.

Example 22: The system of example 21, wherein the second sequence comprises: update the output of the multiplexer by a linear control of the one or more power gates of the plurality via the first output; update the output of the multiplexer to turn off all the plurality of power gates; update the output of the multiplexer to turn on all the plurality of power gates; update the output of the multiplexer with a computed code; and update the output of the multiplexer by the linear control of the one or more power gates of the plurality via the first output.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a plurality of power gates coupled to a first power supply rail and a second power supply rail;
a multiplexer having an output to control the plurality of power gates;
a first controller to generate a first output which is coupled to a first input of the multiplexer, wherein the multiplexer is to control the plurality of power gates with the first output in a normal mode; and
a second controller to generate a second output which is coupled to a second input of the multiplexer, wherein the multiplexer is to control the plurality of power gates with the second output in one of: an overshoot event on the second power supply rail or a droop event on the second power supply rail;
wherein the first controller includes a first counter and the second controller includes a second counter, and wherein the first counter operates at a slower frequency than the second counter.

2. The apparatus of claim 1, further comprising an analog-to-digital converter (ADC) having an input coupled to the second power supply rail via a voltage divider, and an output coupled to the second controller.

3. The apparatus of claim 2, wherein the second controller comprises a comparator to compare the output of the ADC with a voltage identification code (VID).

4. The apparatus of claim 3, wherein an output of the comparator is used to generate select control for the multiplexer to select one of the first or second outputs.

5. The apparatus of claim 1, wherein in case of the droop event on the second power supply rail, the second controller is to control the multiplexer such that the multiplexer updates the output of the multiplexer in a first sequence.

6. The apparatus of claim 5, wherein the first sequence comprises:
update the output of the multiplexer by a linear control of the plurality of power gates;
update the output of the multiplexer to turn on all the plurality of power gates;
update the output of the multiplexer to turn off all the plurality of power gates;
update the output of the multiplexer with a computed code; and
update the output of the multiplexer by the linear control of the plurality of power gates via the first output.

7. The apparatus of claim 1, wherein in case of the overshoot event on the second power supply rail, the second controller is to control the multiplexer such that the multiplexer updates the output of the multiplexer in a second sequence.

8. The apparatus of claim 7, wherein the second sequence comprises:
- update the output of the multiplexer by a linear control of the plurality of power gates via the first output;
- update the output of the multiplexer to turn off all the plurality of power gates;
- update the output of the multiplexer to turn on all the plurality of power gates;
- update the output of the multiplexer with a computed code; and
- update the output of the multiplexer by the linear control of the plurality of power gates via the first output.

9. The apparatus of claim 1, further comprising a load coupled to the second power supply rail.

10. The apparatus of claim 9, wherein the load comprises a processor core.

11. An apparatus comprising:
- a plurality of power gates coupled to a first power supply rail and a second power supply rail;
- an analog-to-digital converter (ADC) coupled to the second power supply rail, the ADC to provide a digital representation of a voltage on the second power supply rail;
- logic to receive the digital representation of the voltage and to generate one or more controls; and
- a multiplexer to receive one of the one or more controls and to selectively provide a digital code to turn on or off one or more of the plurality of power gates, wherein the multiplexer is to, according to the one or more controls, generate the digital code to cause all the plurality of power gates to turn on, cause all the plurality of power gates to turn off, linearly control the plurality of power gates, or to provide a computed digital code according to an event on the second power supply rail;
- wherein when the event is a voltage droop event on the second power supply rail, wherein the logic is to control the multiplexer such that the multiplexer provides updates to the digital code in a first sequence, and wherein the first sequence comprises:
  - update the digital code by a linear control of the one or more of the plurality of power gates;
  - update the digital code to turn on all the plurality of power gates;
  - update the digital code to turn off all the plurality of power gates;
  - update the digital code with a computed code; and
  - update the digital code by the linear control of the one or more of the plurality of power gates.

12. The apparatus of claim 11, further comprising a buffer coupled to an output of the multiplexer and the plurality of power gates.

13. The apparatus of claim 11, wherein, when the event is a voltage overshoot event on the second power supply rail, the logic is to control the multiplexer such that the multiplexer provides updates to the digital code in a second sequence.

14. The apparatus of claim 13, wherein the second sequence comprises:
- update the digital code by a linear control of the one or more of the plurality of power gates;
- update the digital code to turn off all the plurality of power gates;
- update the digital code to turn on all the plurality of power gates;
- update the digital code with a computed code; and
- update the digital code by the linear control of the one or more of the plurality of power gates.

15. A system comprising:
- a memory;
- a processor core coupled to the memory; and
- a voltage regulation circuitry coupled to the processor core, wherein the voltage regulation circuitry comprises:
  - a plurality of power gates coupled to a first power supply rail and a second power supply rail;
  - a multiplexer having an output to control the plurality of power gates;
  - a first controller to generate a first output which is coupled to a first input of the multiplexer, wherein the multiplexer is to control the plurality of power gates with the first output in a normal mode; and
  - a second controller to generate a second output which is coupled to a second input of the multiplexer, wherein the multiplexer is to control the plurality of power gates with the second output in one of: an overshoot event on the second power supply rail or a droop event on the second power supply rail;
- wherein in case of the droop event on the second power supply rail, the second controller is to control the multiplexer such that the multiplexer updates the output of the multiplexer in a first sequence, wherein the first sequence comprises:
  - update the output of the multiplexer by a linear control of the plurality of power gates;
  - update the output of the multiplexer to turn on all the plurality of power gates;
  - update the output of the multiplexer to turn off all the plurality of power gates;
  - update the output of the multiplexer with a computed code; and
  - update the output of the multiplexer by the linear control of the plurality of power gates via the first output.

16. The system of claim 15, wherein in case of the overshoot event on the second power supply rail, the second controller is to control the multiplexer such that the multiplexer updates the output of the multiplexer in a second sequence.

17. The system of claim 16, wherein the second sequence comprises:
- update the output of the multiplexer by a linear control of the plurality of power gates via the first output;
- update the output of the multiplexer to turn off all the plurality of power gates;
- update the output of the multiplexer to turn on all the plurality of power gates;
- update the output of the multiplexer with a computed code; and
- update the output of the multiplexer by the linear control of the plurality of power gates via the first output.

18. An apparatus comprising:
- a plurality of power gates coupled to a first power supply rail and a second power supply rail;
- a multiplexer having an output to control the plurality of power gates;
- a first controller to generate a first output which is coupled to a first input of the multiplexer, wherein the multiplexer is to control the plurality of power gates with the first output in a normal mode; and
- a second controller to generate a second output which is coupled to a second input of the multiplexer, wherein the multiplexer is to control the plurality of power gates with the second output in one of: an overshoot event on the second power supply rail or a droop event on the second power supply rail;

wherein in case of the overshoot event on the second power supply rail, the second controller is to control the multiplexer such that the multiplexer updates the output of the multiplexer in a sequence that includes:

update the output of the multiplexer by a linear control of the plurality of power gates via the first output;

update the output of the multiplexer to turn off all the plurality of power gates;

update the output of the multiplexer to turn on all the plurality of power gates;

update the output of the multiplexer with a computed code; and update the output of the multiplexer by the linear control of the plurality of power gates via the first output.

19. The apparatus of claim 18, further comprising a processor coupled to the second power supply rail.

20. The apparatus of claim 18, further comprising an analog-to-digital converter (ADC) having an input coupled to the second power supply rail via a voltage divider, and an output coupled to the second controller.

21. The apparatus of claim 20, wherein the second controller comprises a comparator to compare the output of the ADC with a voltage identification code (VID).

22. The apparatus of claim 21, wherein an output of the comparator is used to generate a select control for the multiplexer to select one of the first or second outputs.

* * * * *